United States Patent
Zhang et al.

(10) Patent No.: US 11,638,249 B2
(45) Date of Patent: Apr. 25, 2023

(54) COMMUNICATION METHOD AND WIRELESS APPARATUS

(71) Applicant: HUAWEI TECHNOLOGIES CO., LTD., Guangdong (CN)

(72) Inventors: Xingwei Zhang, Lund (SE); Lili Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 89 days.

(21) Appl. No.: 16/993,700

(22) Filed: Aug. 14, 2020

(65) Prior Publication Data

US 2020/0374878 A1 Nov. 26, 2020

Related U.S. Application Data

(63) Continuation of application No. PCT/CN2019/073966, filed on Jan. 30, 2019.

(30) Foreign Application Priority Data

Feb. 14, 2018 (CN) .......................... 201810152378.1

(51) Int. Cl.
*H04W 72/0446* (2023.01)
*H04L 5/00* (2006.01)
*H04W 72/23* (2023.01)

(52) U.S. Cl.
CPC ......... *H04W 72/0446* (2013.01); *H04L 5/001* (2013.01); *H04L 5/0094* (2013.01);
(Continued)

(58) Field of Classification Search
CPC .. H04L 5/001; H04L 5/0094; H04W 72/0446; H04W 72/042
See application file for complete search history.

(56) References Cited

U.S. PATENT DOCUMENTS

2017/0332396 A1 11/2017 Liao et al.
2018/0368114 A1* 12/2018 Chen ................ H04W 72/0413
(Continued)

FOREIGN PATENT DOCUMENTS

CN 102811495 A 12/2012
CN 102857463 A 1/2013
(Continued)

OTHER PUBLICATIONS

Office Action issued in Chinese Application No. 202011588485.2 dated Sep. 29, 2021, 9 pages.
(Continued)

*Primary Examiner* — Kevin C. Harper
(74) *Attorney, Agent, or Firm* — Fish & Richardson P.C.

(57) ABSTRACT

Example communication methods and apparatus are described. One example communication method includes receiving signaling on a first carrier by a terminal device. The terminal device determines slot formats of N slots on at least one second carrier, where the slot formats of the N slots are determined based on M slot formats. N and M are positive integers. The M slot formats are obtained based on the received signaling, and the N slots are determined based on at least one of the following: a moment at which the signaling is received, and a relationship between a length of a first slot on the first carrier and a length of a second slot on the at least one second carrier. According to the communication method, the terminal device, and a network device in this application, slot formats of slots on a plurality of carriers can be determined.

18 Claims, 13 Drawing Sheets

(52) U.S. Cl.
CPC .......... *H04W 72/23* (2023.01); *H04L 5/0092* (2013.01); *H04L 5/0098* (2013.01)

(56) References Cited

U.S. PATENT DOCUMENTS

| | | | | |
|---|---|---|---|---|
| 2019/0222380 | A1* | 7/2019 | Manolakos | H04L 25/0224 |
| 2019/0245648 | A1* | 8/2019 | Jo | H04L 5/0094 |
| 2019/0349904 | A1* | 11/2019 | Kwak | H04L 5/0094 |
| 2020/0260417 | A1* | 8/2020 | Jo | H04L 5/001 |
| 2020/0280388 | A1* | 9/2020 | Shen | H04L 5/0053 |
| 2021/0051666 | A1* | 2/2021 | Takeda | H04W 72/042 |

FOREIGN PATENT DOCUMENTS

| | | |
|---|---|---|
| CN | 107211395 A | 9/2017 |
| WO | 2017073084 A1 | 5/2017 |

OTHER PUBLICATIONS

Oppo, "Remaining issues on GC-PDCCH," 3GPP TSG RAN WG1 Meeting #91, R1-1719984, Reno, USA, Nov. 27-Dec. 1, 2017, 8 pages.

Oppo, "Remaining issues on GC-PDCCH", 3GPP TSG RAN WG1 Meeting AH 1801, R1-1800496, Vancouver, Canada, Jan. 22-26, 2018, total 7 pages.

3GPP TS 38.213 V15.0.0 (Dec. 2017), "3rd Generation Partnership Project; Technical Specification Group Radio Access Network; NR; Physical layer procedures for control (Release 15)," Dec. 2017, 56 pages.

3GPP TS 38.331 V15.0.0 (Dec. 2017), "3rd Generation Partnership Project; Technical Specification Group Radio Access Network NR Radio Resource Control (RRC) protocol specification (Release 15)," Dec. 2017, 188 pages.

Office Action issued in Chinese Application No. 201810152378.1 dated Apr. 22, 2020, 12 pages (with English translation).

PCT International Search Report and Written Opinion issued in International Application No. PCT/CN2019/073966 dated Apr. 23, 2019, 17 pages (with English translation).

Extended European Search Report issued in European Application No. 19753967.9 dated Mar. 2, 2021, 10 pages.

LG Electronics, "Discussion on group common PDCCH," 3GPP TSG RAN WG1 NR AH1801, R1-1800373, Vancouver, Canada, Jan. 22-26, 2018, 15 pages.

ZTE, Sanechips, "Remaining issues for slot format," 3GPP TSG RAN WG1 Meeting AH 1801, R1-1800131, Vancouver, Canada, Jan. 22-26, 2018, 11 pages.

* cited by examiner

COMMUNICATION METHOD AND WIRELESS APPARATUS

CROSS-REFERENCE TO RELATED APPLICATIONS

This application is a continuation of International Application No. PCT/CN2019/073966, filed on Jan. 30, 2019, which claims priority to Chinese Patent Application No. 201810152378.1, filed on Feb. 14, 2018. The disclosures of the aforementioned applications are hereby incorporated by reference in their entireties.

TECHNICAL FIELD

This application relates to the communications field, and more specifically, to a communication method and a wireless apparatus.

BACKGROUND

A plurality of subcarrier spacing (subcarrier spacing, SCS) are introduced to a 5th generation (5th generation, 5G) system, and different carriers may have different SCSs. A baseline of the SCS is 15 kHz. The SCS may be 15 kHz×$2^m$, where m∈(−2, 0, 1 . . . , 5). In other words, the SCS may be 3.75 kHz, 7.5 kHz, . . . , and 480 kHz. Correspondingly, a carrier may correspond to a plurality of symbol lengths and a plurality of slot lengths.

There may be different slot types, and quantities of included symbols are different in different slot types. For example, a mini-slot includes fewer than 14 symbols (for example, one symbol, two symbols, four symbols, or seven symbols), and an ordinary slot includes 14 symbols. One slot may include at least one of a downlink transmission symbol, an unknown symbol, and an uplink transmission symbol. Therefore, there are different slot formats, and there are a maximum of 256 slot formats. Quantities of included uplink symbols, quantities of included downlink symbols, or quantities of guard period symbols are different in different slot formats. Therefore, how to determine a slot format is an urgent problem that needs to be resolved.

SUMMARY

This application provides a communication method and a wireless apparatus, so that a plurality of slot formats of slots on a plurality of carriers can be determined when a slot format is indicated in a cross-carrier scenario.

According to a first aspect, a communication method is provided, including: receiving, by a terminal device, signaling on a first carrier; and determining, by the terminal device, slot formats of N slots on at least one second carrier, where the slot formats of the N slots are determined based on M slot formats, N and M are positive integers, the M slot formats are obtained based on the received signaling, and the N slots are determined based on at least one of the following: a moment at which the signaling is received, and a relationship between a length of a first slot on the first carrier and a length of a second slot on the at least one second carrier.

According to the technical solution in this embodiment of this application, when a slot format is indicated in a cross-carrier scenario, a base station and UE may obtain M slot formats based on signaling that is sent or received on a first carrier, and then determine a slot format of a slot on a second carrier based on the obtained M slot formats. This can resolve a problem that the slot format of the slot on the second carrier cannot be determined when the slot format is indicated in the cross-carrier scenario. In addition, slot formats of all slots in one carrier are indicated, so that signaling overheads can be reduced.

In some possible implementations, the method further includes: determining, by the terminal device, a start slot of the N slots based on the moment at which the signaling is received.

In the foregoing technical solution, the terminal device determines the start slot of the N slots based on the moment at which the signaling is received, for example, based on a corresponding position of the receiving moment on the second carrier, so that the terminal device can determine a specific slot, on the second carrier, to which the M slot formats start to be applied.

In some possible implementations, the start slot of the N slots is a slot in which the moment at which the signaling is received is located on the at least one second carrier, or the start slot of the N slots is a next slot of a slot in which the moment at which the signaling is received is located on the at least one second carrier.

In some possible implementations. M is equal to N, and the M slots are applied to the N slot formats. For example, the M slots respectively correspond to the N slot formats, or one-to-one correspond to the N slot formats.

In the foregoing technical solution, when M is equal to N, the N slots one-to-one correspond to the M slot formats, to be specific, $N_1$ corresponds to $M_1$, $N_2$ corresponds to $M_2$, . . . , and $N_N$ corresponds to $M_M$. In this way, the slot formats of the N slots can be quickly determined, and a communication rate is increased.

In some possible implementations, the M slot formats are applied to M slot groups, and each of the M slot groups includes at least one of the N slots. For example, the M slot formats respectively correspond to the M slot groups, or the M slot formats one-to-one correspond to the M slot groups.

In the foregoing technical solution, slots on the second carrier are grouped. Slots belonging to a same slot group have a same slot format, and the M slot formats one-to-one correspond to the grouped slot groups. In this way, the slot formats of the N slots can be determined by applying the M slot formats to the M slot groups respectively. This can quickly determine the slot formats of the N slots and increase a communication rate.

In some possible implementations, a quantity of slots included in each slot group is determined based on the relationship between the length of the first slot and the length of the second slot.

In some possible implementations, the method further includes: determining, by the terminal device, slot formats of S slots, where the S slots are slots other than the N slots in one monitoring period, and the slot formats of the S slots are determined based on a preconfigured slot format or at least one of the M slot formats.

In the foregoing technical solution, after the slot formats of the N slots are determined, if there is still a remaining slot in one monitoring period in addition to the N slots, a slot format of the remaining slot may be determined based on the preconfigured slot format or at least one of the M slot formats. In this way, slot formats of all slots on the second carrier in one monitoring period can be determined, and a quantity of slots whose slot formats are determined is increased.

In some possible implementations, the S slots are divided into L slot groups, each slot group includes at least one slot, slots in each slot group have a same slot format, and M slot groups of the L slot groups have different slot formats.

Further, any M time-domain adjacent slot groups of the L slot groups have different slot formats. For example, when M=5, the second slot group to the sixth slot group in the L slot groups are adjacent in time domain (or the second slot group to the sixth slot group are pairwise adjacent in slots), and slot formats used by the second slot group to the sixth slot group are different, and the slot formats each are one of five slot formats.

In some possible implementations, the slot formats of the S slots are the $M^{th}$ slot format or the last slot format of the M slot formats.

In the foregoing technical solution, the last slot format of the M slot formats is applied to slot formats of the remaining S slots. This can ensure that some consecutive slots have a same slot format. In this way, the slots can be applied to a slot aggregation scenario.

In some possible implementations, the preconfigured slot format is configured through radio resource control RRC signaling.

In some possible implementations, symbols corresponding to the preconfigured slot format are all uplink symbols or all downlink symbols.

In some possible implementations, the first carrier and the at least one second carrier belong to a plurality of carrier groups, slot formats of slots on carriers in a same carrier group are the same, and slot formats of slots on carriers in different carrier groups are different.

In the foregoing technical solution, a plurality of carriers are grouped, and carriers on which slot formats of slots are the same belong to a same carrier group. In this way, when a slot format of a slot on the second carrier is determined, a slot format of a slot on only one carrier in one carrier group needs to be determined, and a slot format of a slot on each carrier does not need to be determined. This can reduce signaling overheads and can increase a communication rate.

In some possible implementations, a subcarrier spacing SCS of the first carrier is different from a subcarrier spacing SCS of the at least one second carrier.

In the foregoing technical solution, when the SCS of the first carrier is different from the SCS of the second carrier, in this application, the slot format of the slot on the second carrier may be determined based on the M slot formats, so that a problem that the slot format of the slot on the second carrier cannot be determined when the SCS of the first carrier is different from the SCS of the second carrier can be resolved.

According to a second aspect, a communication method is provided, including: receiving, by a terminal device, signaling; determining, by the terminal device, slot formats of M slot groups, where M is a positive integer, the slot formats of the M slot groups are determined based on M slot formats, and the M slot formats are obtained based on the received signaling; and determining, by the terminal device, slot formats of S slots based on a preconfigured slot format or at least one of the M slot formats, where the S slots are slots other than slots in the M slot groups in one monitoring period.

In this embodiment of this application, when a monitoring period P is greater than M, after determining slot formats of M slot groups based on sent or received signaling, a base station or UE may further determine a slot format of a remaining slot based on a preconfigured slot format or at least one of M slot formats. In this way, a problem that the slot format of the remaining slot is uncertain can be resolved.

In some possible implementations, the M slot groups respectively correspond to the M slot groups, and each of the M slot groups includes at least one slot.

In some possible implementations, the S slots are divided into L slot groups, each slot group includes at least one slot, slots in each slot group have a same slot format, and M slot groups of the L slot groups have different slot formats. Further, any M time-domain adjacent slot groups of the L slot groups have different slot formats, or any M consecutive slot groups of the L slot groups have different slot formats. For example, when M=5, the second slot group to the sixth slot group in the L slot groups are adjacent in time domain (or the second slot group to the sixth slot group are pairwise adjacent in slots), and slot formats used by the second slot group to the sixth slot group are different, and the slot formats each are one of five slot formats.

In some possible implementations, the slot formats of the S slots are the $M^{th}$ slot format or the last slot format of the M slot formats.

In the foregoing technical solution, the last slot format of the M slot formats is applied to slot formats of the remaining S slots. This can ensure that some consecutive slots have a same slot format. In this way, the slots can be applied to a slot aggregation scenario.

In some possible implementations, the preconfigured slot format is configured through radio resource control RRC signaling, and/or symbols corresponding to the preconfigured slot format are all uplink symbols or all downlink symbols.

According to a third aspect, a communication method is provided. The method includes: determining, by a network device, slot formats of N slots on at least one second carrier, where the slot formats of the N slots are determined based on M slot formats, and N and M are positive integers; and sending, by the network device, signaling on a first carrier, where the signaling includes indication information of the M slot formats; where the N slots are related to at least one of the following: a moment at which the signaling is sent, and a relationship between a length of a first slot on the first carrier and a length of a second slot on the at least one second carrier.

In some possible implementations, a start slot of the N slots is related to the moment at which the signaling is sent.

In some possible implementations, the start slot of the N slots is a slot in which the moment at which the signaling is sent is located on the at least one second carrier, or the start slot of the N slots is a next slot of a slot in which the moment at which the signaling is sent is located on the at least one second carrier.

In some possible implementations, M is equal to N, and the M slots are applied to the N slot formats. For example, the M slots respectively correspond to the N slot formats, or one-to-one correspond to the N slot formats.

In some possible implementations, the M slot formats are applied to M slot groups, and each of the M slot groups includes at least one of the N slots. For example, the M slot formats respectively correspond to the M slot groups, or the M slot formats one-to-one correspond to the M slot groups.

In some possible implementations, a quantity of slots included in each slot group is determined based on the relationship between the length of the first slot and the length of the second slot.

In some possible implementations, the method further includes: determining, by the network device, slot formats of S slots, where the S slots are slots other than the N slots in one monitoring period, and the slot formats of the S slots are determined based on a preconfigured slot format or at least one of the M slot formats.

In some possible implementations, the S slots are divided into L slot groups, each slot group includes at least one slot, slots in each slot group have a same slot format, and M slot groups of the L slot groups have different slot formats.

In some possible implementations, the slot formats of the S slots are the $M^{th}$ slot format or the last slot format of the M slot formats.

In some possible implementations, the preconfigured slot format is configured through radio resource control RRC signaling.

In some possible implementations, symbols corresponding to the preconfigured slot format are all uplink symbols or all downlink symbols.

In some possible implementations, a plurality of the first carrier and the at least one second carrier belong to a plurality of carrier groups, slot formats of slots on carriers in a same carrier group are the same, and slot formats of slots on carriers in different carrier groups are different.

In some possible implementations, a subcarrier spacing SCS of the first carrier is different from a subcarrier spacing SCS of the at least one second carrier.

According to a fourth aspect, a communication method is provided, including: determining, by a network device, slot formats of M slot groups, where M is a positive integer, and the slot formats of the M slot groups are determined based on M slot formats; and sending, by the network device, signaling, where the signaling includes indication information of the M slot formats, S slot formats are related to a preconfigured slot format or at least one of the M slot formats, and S slots are slots other than slots in the M slot groups in one monitoring period.

In some possible implementations, the M slot formats respectively correspond to the M slot groups, and each of the M slot groups includes at least one slot.

In some possible implementations, the S slots are divided into L slot groups, each slot group includes at least one slot, slots in each slot group have a same slot format, and M slot groups of the L slot groups have different slot formats.

In some possible implementations, the slot formats of the S slots are the $M^{th}$ slot format or the last slot format of the M slot formats.

In some possible implementations, the preconfigured slot format is configured through radio resource control RRC signaling, and/or symbols corresponding to the preconfigured slot format are all uplink symbols or all downlink symbols.

According to a fifth aspect, a wireless apparatus is provided, including units configured to perform the method in any one of the first aspect or the possible implementations of the first aspect.

According to a sixth aspect, a wireless apparatus is provided, including units configured to perform the method in any one of the second aspect or the possible implementations of the second aspect.

According to a seventh aspect, a network device is provided, including units configured to perform the method in any one of the third aspect or the possible implementations of the third aspect.

According to an eighth aspect, a network device is provided, including units configured to perform the method in any one of the fourth aspect or the possible implementations of the fourth aspect.

According to a ninth aspect, a wireless apparatus is provided. The wireless apparatus includes a processor, configured to implement functions of the terminal device in the method described in the first aspect. The wireless apparatus may further include a memory, configured to store a program instruction and data. The memory is coupled to the processor. The processor may invoke and execute the program instruction stored in the memory, to implement functions of the terminal device in the method described in the first aspect. The wireless apparatus may further include a transceiver, and the transceiver is used by the wireless apparatus to communicate with another device. For example, the another device is a network device.

In a possible apparatus, the wireless apparatus includes a transceiver (or a receiver) and a processor, where the transceiver (or the receiver) is configured to receive signaling on a first carrier; and the processor is configured to determine slot formats of N slots on at least one second carrier, where the slot formats of the N slots are determined based on M slot formats, N and M are positive integers, the M slot formats are obtained based on the received signaling, and the N slots are determined based on at least one of the following: a moment at which the signaling is received, and a relationship between a length of a first slot on the first carrier and a length of a second slot on the at least one second carrier.

In some possible implementations, the processor is further configured to determine a start slot of the N slots based on the moment at which the signaling is received.

In some possible implementations, the start slot of the N slots is a slot in which the moment at which the signaling is received is located on the at least one second carrier, or the start slot of the N slots is a next slot of a slot in which the moment at which the signaling is received is located on the at least one second carrier.

In some possible implementations, M is equal to N, and the M slots are applied to the N slot formats. For example, the M slots respectively correspond to the N slot formats, or one-to-one correspond to the N slot formats.

In some possible implementations, the M slot formats are applied to M slot groups, and each of the M slot groups includes at least one of the N slots. For example, the M slot formats respectively correspond to the M slot groups, or the M slot formats one-to-one correspond to the M slot groups.

In some possible implementations, a quantity of slots included in each slot group is determined based on the relationship between the length of the first slot and the length of the second slot.

In some possible implementations, the processor may be further configured to determine slot formats of S slots, where the S slots are slots other than the N slots in one monitoring period, and the slot formats of the S slots are determined based on a preconfigured slot format or at least one of the M slot formats.

In some possible implementations, the S slots are divided into L slot groups, each slot group includes at least one slot, slots in each slot group have a same slot format, and M slot groups of the L slot groups have different slot formats.

In some possible implementations, the slot formats of the S slots are the $M^{th}$ slot format or the last slot format of the M slot formats.

In some possible implementations, the preconfigured slot format is configured through radio resource control RRC signaling.

In some possible implementations, symbols corresponding to the preconfigured slot format are all uplink symbols or all downlink symbols.

In some possible implementations, the first carrier and the at least one second carrier belong to a plurality of carrier groups, slot formats of slots on carriers in a same carrier group are the same, and slot formats of slots on carriers in different carrier groups are different.

In some possible implementations, a subcarrier spacing SCS of the first carrier is different from a subcarrier spacing SCS of the at least one second carrier.

According to a tenth aspect, a wireless apparatus is provided. The wireless apparatus includes a processor, configured to implement functions of the terminal device in the method described in the second aspect. The wireless apparatus may further include a memory, configured to store a program instruction and data. The memory is coupled to the processor. The processor may invoke and execute the program instruction stored in the memory, to implement functions of the terminal device in the method described in the second aspect. The wireless apparatus may further include a transceiver, and the transceiver is used by the wireless apparatus to communicate with another device. For example, the another device is a network device.

In a possible apparatus, the wireless apparatus includes a transceiver (or a receiver) and a processor, where the transceiver (or the receiver) is configured to receive signaling on a first carrier;

the processor is configured to determine slot formats of M slot groups, where M is a positive integer, the slot formats of the M slot groups are determined based on M slot formats, and the M slot formats are obtained based on the received signaling; and the processor is configured to determine slot formats of S slots based on a preconfigured slot format or at least one of the M slot formats, where the S slots are slots other than slots in the M slot groups in one monitoring period.

In some possible implementations, the M slot groups respectively correspond to the M slot groups, and each of the M slot groups includes at least one slot.

In some possible implementations, the S slots are divided into L slot groups, each slot group includes at least one slot, slots in each slot group have a same slot format, and M slot groups of the L slot groups have different slot formats.

In some possible implementations, the slot formats of the S slots are the $M^{th}$ slot format or the last slot format of the M slot formats.

In some possible implementations, the preconfigured slot format is configured through radio resource control RRC signaling, and/or symbols corresponding to the preconfigured slot format are all uplink symbols or all downlink symbols.

According to an eleventh aspect, a network device is provided, including a processor and a memory. The memory is configured to store a computer instruction. The processor is configured to execute the computer instruction stored in the memory, and when the computer instruction is executed, the processor is configured to perform the method according to any one of the third aspect or the possible implementations of the third aspect.

According to a twelfth aspect, a network device is provided, including a processor and a memory. The memory is configured to store a computer instruction. The processor is configured to execute the computer instruction stored in the memory, and when the computer instruction is executed, the processor is configured to perform the method according to any one of the fourth aspect or the possible implementations of the fourth aspect.

According to a thirteenth aspect, a computer storage medium is provided, including a computer instruction. When the computer instruction is run on a computer, the computer is enabled to perform the method according to any one of the first aspect or the possible implementations of the first aspect.

According to a fourteenth aspect, a computer storage medium is provided, including a computer instruction. When the computer instruction is run on a computer, the computer is enabled to perform the method according to any one of the second aspect or the possible implementations of the second aspect.

According to a fifteenth aspect, a computer storage medium is provided, including a computer instruction. When the computer instruction is run on a computer, the computer is enabled to perform the method according to any one of the third aspect or the possible implementations of the third aspect.

According to a sixteenth aspect, a computer storage medium is provided, including a computer instruction. When the computer instruction is run on a computer, the computer is enabled to perform the method according to any one of the fourth aspect or the possible implementations of the fourth aspect.

According to a seventeenth aspect, a system is provided, including the wireless apparatus according to the fifth aspect or the sixth aspect and the network device according to the seventh aspect or the eighth aspect.

BRIEF DESCRIPTION OF DRAWINGS

FIG. 3 is a schematic diagram of indicating a slot format in a cross-carrier scenario according to an embodiment of this application:

FIG. 4 is a schematic diagram of indicating a slot format in a cross-carrier scenario according to an embodiment of this application:

FIG. 5 is a schematic diagram of indicating a slot format in a cross-carrier scenario according to an embodiment of this application:

DESCRIPTION OF EMBODIMENTS

Figure 1:
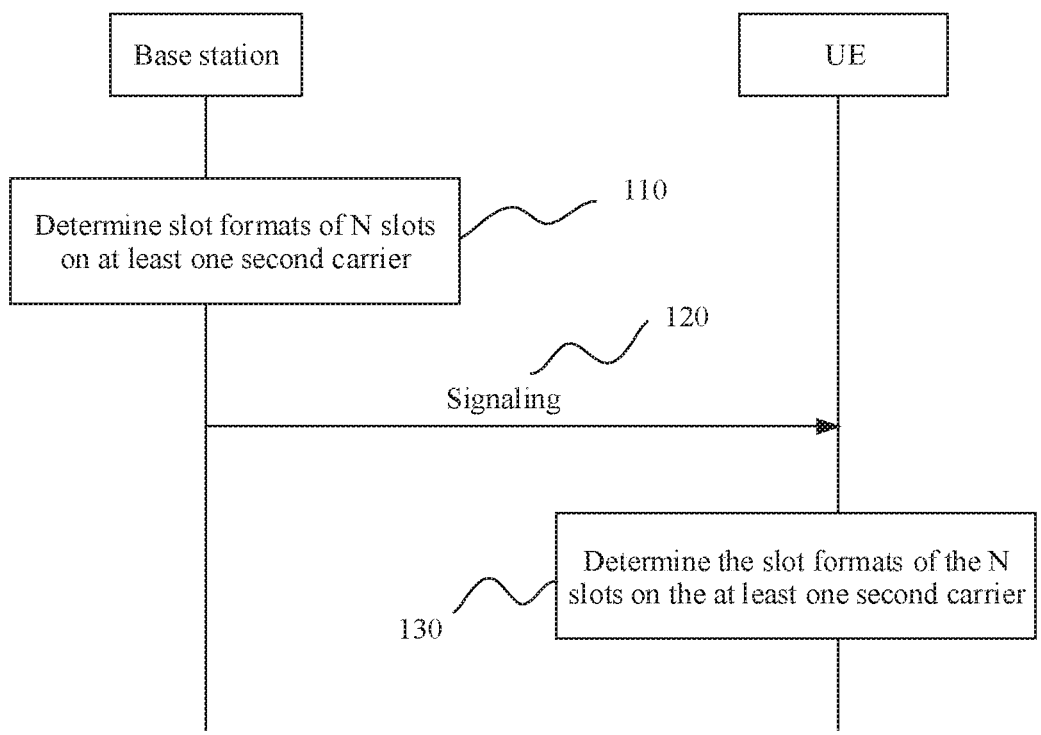
FIG. 1 is a schematic interaction diagram of a communication method according to an embodiment of this application.

The following describes the technical solutions of this application with reference to the accompanying drawings.

The technical solutions of the embodiments of this application may be applied to various communications systems, for example, a global system for mobile communications (global system for mobile communications, GSM) system, a code division multiple access (code division multiple access, CDMA) system, a wideband code division multiple access (wideband code division multiple access. WCDMA) system, a general packet radio service (general packet radio service, GPRS) system, a long term evolution (long term evolution, LTE) system, an LTE frequency division duplex (frequency division duplex, FDD) system, an LTE time division duplex (time division duplex, TDD) system, a universal mobile telecommunications system (universal mobile telecommunication system, UMTS), a worldwide interoperability for microwave access (worldwide interoperability for microwave access, WiMAX) communications system, and a future 5th generation (5th generation, 5G) system. The 5G system may also be referred to as a new radio (new radio, NR) system.

A terminal device in the embodiments of this application may also be referred to as a terminal, and is a device that has a wireless transceiver function. The terminal device may be deployed on the land, for example, the terminal device is an indoor device, an outdoor device, a handheld device, or a vehicle-mounted device; or the terminal device may be deployed on the water (for example, on a ship); or the terminal device may be deployed in the air (for example, on a plane, a balloon, or a satellite). The terminal device may be user equipment (user equipment, UE), and the UE is a handheld device, a vehicle-mounted device, a wearable device, or a computing device that has a wireless communication function. For example, the UE may be a mobile phone (mobile phone), a tablet computer, or a computer with a wireless transceiver function. Alternatively, the terminal device may be a virtual reality (virtual reality, VR) terminal device, an augmented reality (augmented reality, AR) terminal device, a wireless terminal in industrial control, a wireless terminal in self driving, a wireless terminal in telemedicine, a wireless terminal in a smart grid, a wireless terminal in a smart city (smart city), a wireless terminal in a smart home (smart home), or the like. In the embodiments of this application, an apparatus for implementing a function of the terminal device may be a terminal device, or may be an apparatus, in a terminal device, for supporting the terminal device in implementing the function. In the embodiments of this application, an example in which the apparatus for implementing the function of the terminal device is a terminal device is used to describe the technical solutions provided in the embodiments of this application.

A network device in the embodiments of this application is a base station (base station, BS), and is a device, deployed in a radio access network, that can perform wireless communication with the terminal. The base station may be in a plurality of forms, such as a macro base station, a micro base station, a relay node, and an access point. For example, the base station in the embodiments of this application may be a base station in a 5G system or a base station in an LTE system. The base station in the 5G system may also be referred to as a transmission reception point (transmission reception point, TRP) or a gNB. In the embodiments of this application, an apparatus for implementing a function of the network device may be a network device, or may be an apparatus, in a network device, for supporting the network device in implementing the function. In the embodiments of this application, an example in which the apparatus for implementing the function of the network device is a network device is used to describe the technical solutions provided in the embodiments of this application.

For ease of description, in the embodiments of this application, an example in which the terminal device is UE and the network device is a base station is used to describe the technical solutions provided in the embodiments of this application. However, this application is not limited thereto.

The following further describes the embodiments of this application in detail. In the descriptions about the embodiments, a latency between uplink and downlink that may exist is ignored, and it is assumed that a sending moment of the network device is the same as a receiving moment of the terminal device. For processing corresponding to sending of the network device and receiving of the terminal device descriptions are mainly provided from a perspective of the terminal device in the embodiments. A person skilled in the art may understand that, the terminal device performs receiving from the network device indicates that the network device performs sending.

FIG. 1 is a schematic interaction diagram of a communication method according to an embodiment of this application.

It should be understood that the method in FIG. 1 may be applied to a multi-carrier scenario. Optionally, the method in FIG. 1 may be applied to but is not limited to a cross-carrier SFI indication scenario, for example, a scenario in which a slot format of a slot on one carrier is indicated on another carrier and the two carriers have different SCSs.

The method in FIG. 1 may include steps 110 to 130. The following separately describes steps 110 to 130 in detail.

110: A base station determines slot formats of N slots on at least one second carrier.

Optionally, the slot formats of the N slots are determined based on M slot formats, and N and M are positive integers.

It should be noted herein that the base station may determine the slot formats of the N slots in a plurality of specific implementations. A determining manner on the base station side is not specifically limited in the embodiments of this application, provided that the base station can determine the slot formats of the N slots.

For ease of description, the following embodiments are described by using an example in which there is only one second carrier. However, this application is not limited thereto.

120: The base station sends signaling to UE on a first carrier.

Accordingly, the UE may receive the signaling on the first carrier.

Optionally, the signaling may be higher layer signaling, for example, radio resource control (radio resource control, RRC) signaling.

Optionally, the signaling may be physical layer signaling, for example, downlink control information (downlink control information, DCI). The signaling may be carried on a physical downlink control channel (physical downlink control channel, PDCCH), an enhanced physical downlink control channel (enhanced physical downlink control channel. EPDCCH), a machine type communication physical downlink control channel (machine type communication physical downlink control channel, MPDCCH), a physical sidelink control channel (physical sidelink control channel, PSCCH), or a narrowband physical downlink control channel (narrowband physical downlink control channel, NPDCCH). This is not limited in this application.

Optionally, the signaling may be a combination of higher layer signaling and physical layer signaling, for example, a combination of RRC signaling and a DCI message.

Optionally, the signaling may include indication information of the M slot formats. For the UE, information about the M slot formats is obtained through the signaling. In other words, the UE obtains the information about the M slot formats through the indication information carried in the signaling.

It should be understood that, in the embodiments of this application, the signaling may also be referred to as first signaling. This is not specifically limited in this application.

Optionally, the second carrier is a carrier other than the first carrier.

Optionally, an SCS of the first carrier may be different from an SCS of the second carrier. In other words, a length of a first slot on the first carrier may be different from a length of a second slot on the second carrier.

For example, the SCS of the first carrier is 30 kHz. and the SCS of the second carrier is 15 kHz. In this case, the length of the second slot is twice the length of the first slot.

130: The UE determines the slot formats of the N slots on the at least one second carrier.

Optionally, the slot format includes information about a quantity of downlink symbols, about a quantity of unknown symbols, and about a quantity of uplink symbols in one slot.

For example, Table 1 shows 15 slot formats of 256 slot formats. In Table 1, one row represents one slot. It can be learned that each slot includes 14 symbols. In Table 1, "D" represents a downlink symbol, "U" represents an uplink symbol, and "X" represents an unknown symbol. It can be learned that a slot format 0 indicates that 14 symbols in one slot are all downlink symbols, a slot format 1 indicates that 14 symbols in one slot are all uplink symbols, and a slot format 10 indicates that there are one unknown symbol and 13 uplink symbols in one slot.

Optionally, the UE may obtain the M slot formats based on the RRC signaling and/or the DCI signaling.

In an example, one slot may have 256 slot formats, and the UE obtains the 256 slot formats based on a prestored table. M slot formats have $256^M$ slot format combinations in total. The base station may indicate 256 slot format combinations in $256^M$ possible slot format combinations through RRC signaling. After determining the 256 slot format combinations, the base station indicates any one of the 256 slot format combinations through DCI. After receiving the RRC signaling, the UE may learn of the 256 slot format combinations. After receiving the DCI, the UE may learn of a specific slot format combination from a DCI indication, to obtain slot formats of the M slots.

It should be noted herein that a manner in which the base station determines the slot formats of the N slots may be different from a manner in which the UE determines the slot formats. This is not specifically limited in the embodiments of this application.

It should be understood that in the embodiments of this application, there may be same slot formats in the slot formats of the M slots.

Optionally, the UE may determine the N slots based on a moment at which the first signaling is received and/or a relationship between the length of the first slot on the first carrier and the length of the second slot on the second carrier.

It should be understood that, the term "and/or" in the embodiments of this application describes only an association relationship for describing associated objects and represents that three relationships may exist. For example, A and/or B may represent the following three cases: Only A exists, both A and B exist, and only B exists.

Optionally, the relationship between the length of the first slot and the length of the second slot may be that the length of the first slot is H times the length of the second slot. H may be an integer greater than or equal to 1, for example, 2, 4, or 8. H may be alternatively a number less than or equal to 1, for example, 0.5, 0.25, or 0.125.

In an implementation, the UE may determine the N slots based on the moment at which the first signaling is received.

TABLE 1

| Slot format | Quantity of symbols included in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| 7 | D | D | D | D | D | D | D | D | X | X | X | X | X | X |
| 8 | X | X | X | X | X | X | X | X | X | X | X | X | X | U |
| 9 | X | X | X | X | X | X | X | X | X | X | X | X | U | U |
| 10 | X | U | U | U | U | U | U | U | U | U | U | U | U | U |
| 11 | X | X | U | U | U | U | U | U | U | U | U | U | U | U |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |

Optionally, the slot formats of the N slots may be determined based on the M slot formats, and N and M are positive integers.

Optionally, the M slot formats may be obtained based on the signaling received by the UE.

Optionally, the UE may determine the N slots based on a corresponding time-domain position, on the second carrier, of the moment at which the first signaling is received.

Optionally, the position may be a middle position of a slot on the second carrier. The middle position of the slot may be a ½ position, a ¼ position, . . . , or a ⅞ position of the slot.

Optionally, the position may be a start position of a slot on the second carrier.

Optionally, the start position of the slot may indicate a position starting from a slot boundary of the slot.

When the length of the first slot is H times the length of the second slot, the position may be a start position of a slot on the second carrier.

When the length of the second slot is H times the length of the first slot, the position may be a middle position of a slot on the second carrier.

Figure 2:
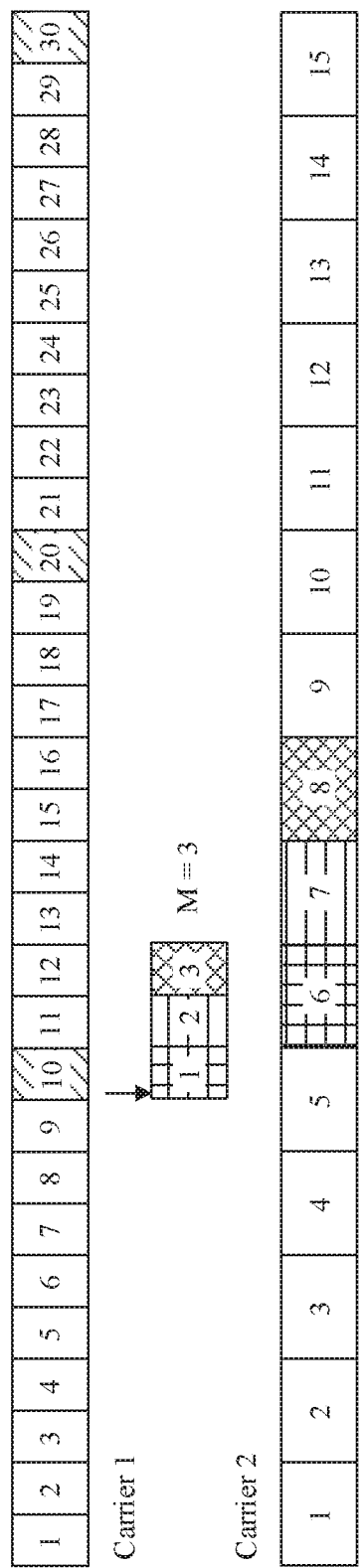
FIG. 2 is a schematic diagram of indicating a slot format in a cross-carrier scenario according to an embodiment of this application.

When the length of the second slot is H times the length of the first slot, for example, as shown in FIG. 2, a carrier 1 is the first carrier, a carrier 2 is the second carrier, and the length of the second slot is twice the length of the first slot. It can be learned that the base station sends the first signaling on the first carrier, and the UE receives, in a slot #10 on the first carrier, the first signaling that includes three slot formats of slots on the second carrier. In this case, a position of the slot #10 on the first carrier corresponds to a ½ position of a slot #5 on the second carrier, that is, a middle position of the slot #5.

Figure 3:
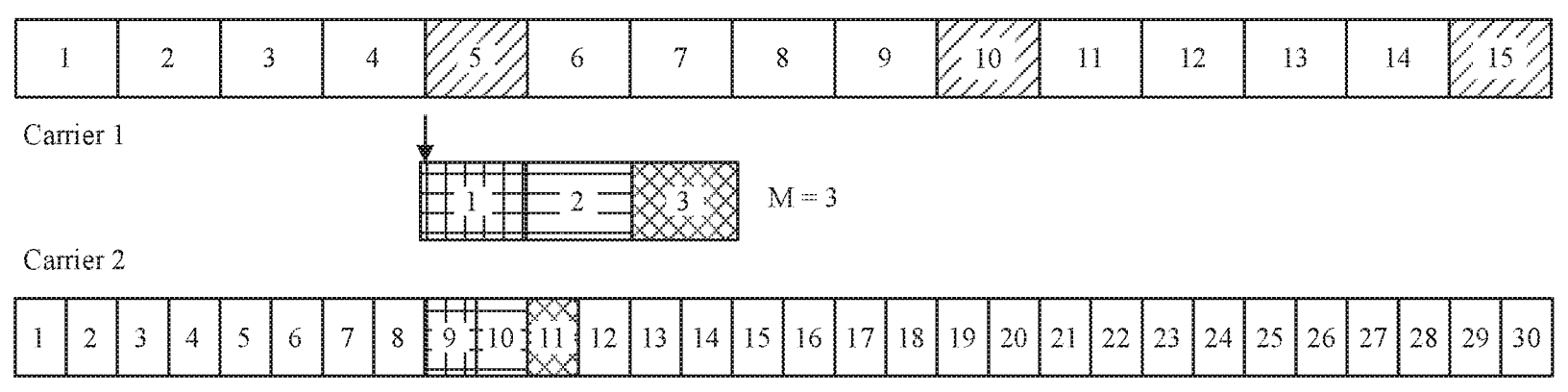

When the length of the first slot is H times the length of the second slot, as shown in FIG. 3, a carrier 1 is the first carrier, a carrier 2 is the second carrier, and the length of the first slot is 2 times the length of the second slot. It can be learned that the base station sends the first signaling on the first carrier, and the UE receives, in a slot #5 on the first carrier, three slot formats of slots on the second carrier. In this case, a position of the slot #5 on the first carrier corresponds to a slot boundary of a slot #9 on the second carrier, that is, a start position of the slot #9.

Optionally, the UE may first determine a start slot of the N slots, and then determine specific N slots.

Optionally, the start slot may indicate the first slot of the N slots.

The UE may determine the start slot in a plurality of implementations. This is not specifically limited in the embodiments of this application. In an example, the UE may determine the start slot of the N slots based on the moment at which the first signaling is received.

Optionally, the UE may determine the start slot of the N slots based on a corresponding time-domain position, on the second carrier, of the moment at which the first signaling is received. Optionally, when the moment at which the UE receives the first signaling is a start moment of a slot on the second carrier, the UE may determine that the start slot is a slot, on the second carrier, in which the moment at which the UE receives the first signaling is located.

Optionally, when the moment at which the UE receives the first signaling is located in a slot on the second carrier but is not a start moment of the slot, the UE may determine that the start slot is a next slot of a corresponding slot, on the second carrier, in which the moment at which the UE receives the first signaling is located.

A position that is in a slot but is not a position corresponding to a start moment of the slot is also described as a middle position of the slot.

Still referring to FIG. 2, it can be learned that the moment at which the UE receives the first signaling is located in the slot #5 on the second carrier but is not a start moment of the slot #5. It may be determined that the start slot is a next slot of the slot #5, that is, the start slot is the slot #6. Based on the start slot #6, the UE may determine that the three slots are the slot #6, a slot #7, and a slot #8.

Optionally, when the moment at which the UE receives the signaling falls within a start position in a slot corresponding to the first carrier, the UE may determine that the start slot of the N slots is the corresponding slot.

Still referring to FIG. 3, it can be learned that the moment at which the UE receives the first signaling is located in the slot #9 on the second carrier. The UE may determine that the start slot is the slot #9. Based on the start slot #9, the UE may determine that the N slots are the slot #9, a slot #10, and a slot #11.

In an example, the UE may determine the start slot of the N slots based on an offset and the corresponding time-domain position, on the second carrier, of the moment at which the first signaling is received.

Optionally, the offset may be used to indicate a slot in which the M slot formats start to take effect.

Optionally, the base station may configure an offset, and send second signaling including the offset to the UE. After receiving the second signaling that is sent by the base station, the UE may determine the start slot of the N slots based on the offset and the corresponding time-domain position, on the second carrier, of the moment at which the first signaling is received.

Optionally, the second signaling may be physical layer signaling, for example, a DCI message, or may be higher layer signaling, for example, RRC signaling.

Optionally, the UE may configure an offset.

Figure 4:
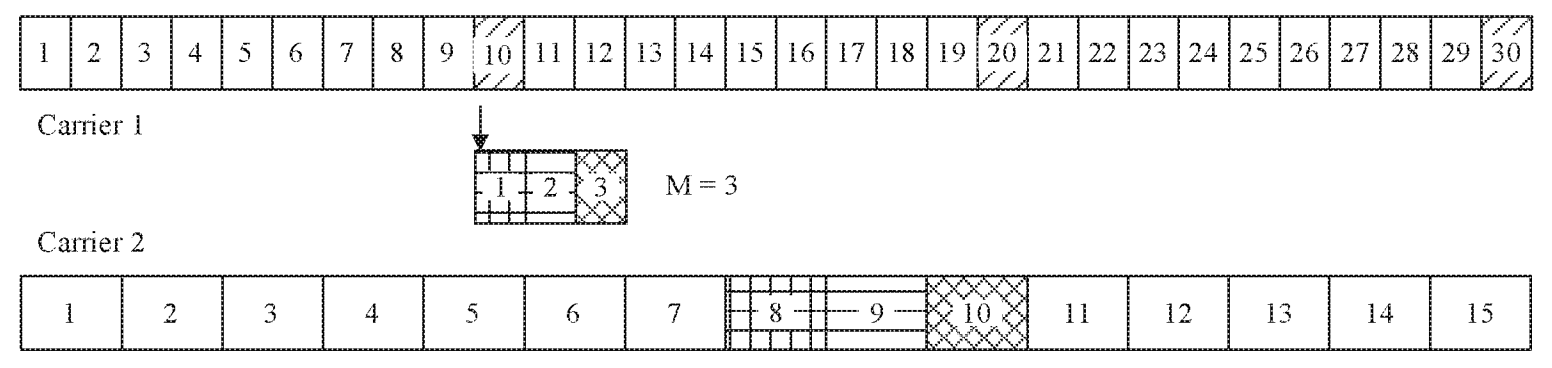

As shown in FIG. 4, assuming that the offset is 2, the UE receives the first signaling in a slot #10 on the first carrier. In this case, a position of the slot #10 corresponds to a middle position of a slot #5 on the second carrier. With reference to the offset, the UE may determine that the start slot is a slot #8. Based on the start slot #8, the UE may determine that the three slots are the slot #8, a slot #9, and the slot #10.

For another example, assuming that the offset is 4, if the length of the first slot is twice the length of the second slot, the UE receives the first signaling in a slot #5 on the first carrier. In this case, a position of the slot #5 corresponds to a slot #9 on the second carrier. With reference to the offset, it may be determined that the start slot is a slot #13. Based on the start slot #13, the UE may determine that the three slots are the slot #13, a slot #14, and a slot #15.

It should be understood that the specific examples in this embodiment of this application are merely intended to help a person skilled in the art better understand the embodiments of this application, rather than limit the scope of the embodiments of this application.

It should be noted that, in some embodiments, the UE may alternatively determine the start slot based on the offset.

In the foregoing technical solution, the UE may determine the start slot of the N slots based on the moment at which the signaling is received, for example, based on a corresponding position of the receiving moment on the second carrier, so that the UE can determine a specific slot, on the second carrier, to which the M slot formats start to be applied.

In an implementation, the UE may determine the N slots based on the moment at which the first signaling is received and the relationship between the length of the first slot and the length of the second slot.

Optionally, when the length of the first slot is H times the length of the second slot, the UE may determine that the quantity of the N slots is M or H×M. In this case, H is an integer greater than or equal to 1.

Optionally, when the length of the second slot is H times the length of the first slot, the UE may determine that the quantity of the N slots is M. In this case, H is an integer greater than or equal to 1.

After determining the quantity of the N slots, the UE may determine the start position of the N slots based on the corresponding time-domain position, on the second carrier, of the moment at which the first signaling is received, and then determine the N slots with reference to the determined quantity of the N slots.

For a description that the UE determines the start slot of the slots based on the corresponding time-domain position, on the second carrier, of the moment at which the first signaling is received, details are described in the foregoing. For brevity, details are not described herein again.

Figure 5:
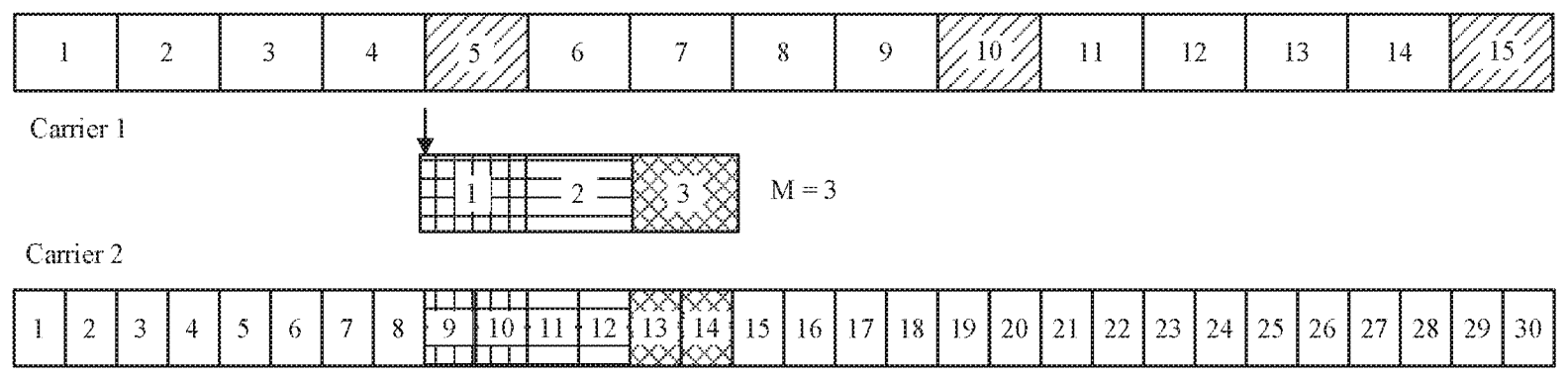

Optionally, when the length of the first slot is H times the length of the second slot, the UE may determine that the quantity of the N slots is M or H×M. For example, when the length of the first slot is twice the length of the second slot, as shown in FIG. 3 and FIG. 5, the quantity of the N slots may be 3 or 6. In FIG. 3, the quantity of the slots is 3; and in FIG. 5, the quantity of the slots is 6. When the quantity of the slots is 6, it may be learned that a position of the moment at which the UE receives the first signaling corresponds to a start position of a slot #9 on the second carrier. With reference to the determined quantity 6 of the slots, the UE may determine that the N slots are the slot #9, a slot #10, a slot #11, a slot #12, a slot #13, and a slot #14.

After determining the N slots, the UE may determine the slot formats of the N slots based on the M slot formats.

In a possible embodiment, when M is equal to N, the M slot formats may respectively correspond to the N slots.

Optionally, the correspondence may be a one-to-one correspondence. To be specific, the first slot $N_1$ in the N slots corresponds to the first slot format $M_1$ in the M slot formats, the second slot $N_2$ in the N slots corresponds to the second slot format $M_2$ in the M slot formats, . . . , and the $N^{th}$ slot $N_N$ in the N slots corresponds to the $M^{th}$ slot format $M_M$ in the M slot formats.

As shown in FIG. 2 to FIG. 4, different patterns in the figures represent different slot formats, and M=N=3. In this case, the three slot formats determined by the UE based on the received first signaling one-to-one correspond to three slots on the second carrier. For example, in FIG. 2, the UE has determined that the three slots are the slot #6, the slot #7, and the slot #8, and three consecutive slot formats may be respectively applied to the slot #6, the slot #7, and the slot #8, to be specific, the first slot format is applied to the slot #6, the second slot format is applied to the slot #7, and the third slot format is applied to the slot #8.

In the foregoing technical solution, when M is equal to N, the N slots one-to-one correspond to the M slot formats, to be specific, $N_1$ corresponds to $M_1$, $N_2$ corresponds to $M_2$, . . . , and $N_N$ corresponds to $M_M$. In this way, the slot formats of the N slots can be quickly determined, and a communication rate can be increased.

In a possible embodiment, it may be assumed that the M slot formats respectively correspond to M slot groups, and each of the M slot groups includes at least one of the N slots. Optionally, a length of a slot in the M slot groups is the length of the second slot.

In other words, the N slots belong to the M consecutive slot groups. The M slot groups one-to-one correspond to the M slot formats.

Optionally, a quantity of slots included in each slot group may be determined based on the relationship between the length of the first slot and the length of the second slot.

In this embodiment of this application, the slot group may also be referred to as a time range or another name. This is not limited in this application.

Optionally, when the length of the first slot is H times the length of the second slot, each slot group may include H slots or one slot, the H slots in each slot group have a same slot format, and slot formats in different slot groups are different. In this case, H is an integer greater than 1.

For example, as shown in FIG. 5, N=6, M=3, and the length of the first slot is twice the length of the second slot. Therefore, each slot group includes two slots, and the six slots may belong to three consecutive slot groups, to be specific, the slot #9 and the slot #10 belong to a first slot group, the slot #11 and the slot #12 belong to a second slot group, and the slot #13 and the slot #14 belong to a third slot group. A slot format of the first slot group is the same as the first slot format $M_1$, and a slot format of the second slot group is the same as the second slot format $M_2$, a slot format of the third slot group is the same as the third slot format $M_3$.

Optionally, when there are still S slots in one monitoring period P in addition to the N slots, the UE may further determine slot formats of the S slots.

Optionally, the S slots are slots other than the N slots in one monitoring period P.

Optionally, the monitoring period is a period in which the UE monitors a PDCCH carrying a slot format indicator (slot format indicator, SFI). In other words, the monitoring period means how often the UE receives the PDCCH to obtain the SFI.

Optionally, the monitoring period may indicate a time interval between two times for receiving the first signaling by the UE.

Figure 6:
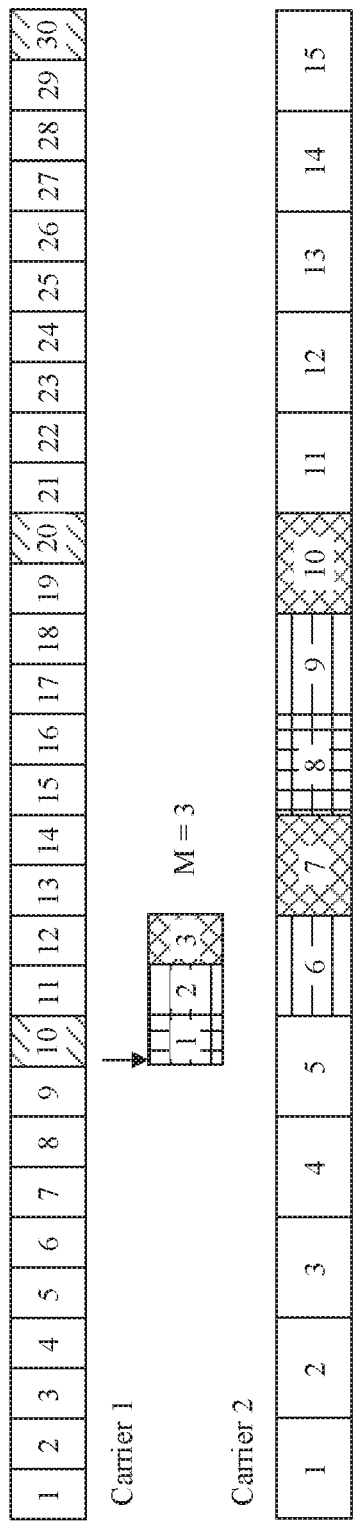
FIG. 6 is a schematic diagram of indicating a slot format in a cross-carrier scenario according to an embodiment of this application.

For example, referring to FIG. 6, M=3. In one monitoring period P, there are still a slot #9 and a slot #10 in addition to the N slots: a slot #6, a slot #7, and a slot #8. In this case, the UE may further determine slot formats of the slot #9 and the slot #10.

Optionally, the slot formats of the S slots may be determined based on a preconfigured slot format or at least one of the M slot formats.

In a possible implementation, the slot formats of the S slots may be determined based on the M slot formats.

Optionally, the S slots may be divided into L slot groups, and slot formats of M slot groups of the L slot groups are different. Optionally, a length of a slot in the L slot groups is the length of the second slot.

In other words, slot formats of two slot groups that are separated by M slot groups are the same, and slot formats of M adjacent slot groups are different from each other.

Each slot group includes at least one slot, and slots in each slot group have a same slot format.

For example, as shown in FIG. 5, the slots #9, #10, #11, #12, #13, and #14 on the second carrier are the N slots, and slots #15, #16, #17, and #18 on the second carrier are the S slots. The slots #15, #16, #17, and #18 may be divided into two slot groups. A first slot group includes the slots #15 and #16, and a second slot group includes the slots #17 and #18. The slots #15 and #16 have a same slot format, the slots #17 and #18 have a same slot format, but the slot format of the slots #15 and #16 is different from the slot format of the slots #17 and #18.

The UE may determine that the slot format of the slots #15 and #16 is the same as the slot format of the slots #9 and #10, where the slots #15 and #16 and the slots #9 and #10 are separated by three slot groups; and determine that the slot format of the slots #17 and #18 is the same as the slot format of the slots #11 and #12, where the slots #17 and #18 and the slots #11 and #12 are separated by three slot groups.

For another example, as shown in FIG. 6, the slots #8, #9, and #10 on the second carrier are the N slots, the slots #6 and

7 on the second carrier are the S slots, and the slots #6 and #7 may be divided into two slot groups. A first slot group includes the slot #6, a second slot group includes the slot #7, and the slot #6 and the slot #7 have different slot formats.

The UE may determine that the slot format of the slot #6 is the same as a slot format of the slot #9, where the slot #9 and the slot #6 are separated by three slot groups; and determine that the slot format of the slot #7 is the same as a slot format of the slot #10, where the slot #10 and the slot #7 are separated by three slot groups.

In a possible implementation, the slot formats of the S slots may be determined based on the $M^{th}$ slot format.

Optionally, the $M^{th}$ slot format may also be referred to as the last slot format in a time sequence or the last slot format, or may have another name. This is not limited in this application.

For example, in FIG. 4, after determining the slot formats of the slot #8, the slot #9, and the slot #10 on the second carrier, the UE may further determine the slot formats of the slots #6 and #7, and the slot formats of the slots #6 and #7 may be the same as the third slot format of the M slot formats.

In the foregoing technical solution, the last slot format of the M slot formats is applied to slot formats of the remaining S slots. This can ensure that some consecutive slots have a same slot format. In this way, the slots can be applied to a slot aggregation scenario.

In a possible implementation, the slot formats of the S slots may be determined based on the preconfigured slot format.

Optionally, the preconfigured slot format is configured through RRC signaling.

Optionally, the base station may send the RRC signaling to the UE, where the RRC signaling may indicate the preconfigured slot format.

The RRC signaling may be common RRC signaling or dedicated RRC signaling. This is not limited in this application.

Optionally, the preconfigured slot format may be determined by the UE based on a protocol specification.

Optionally, in time division duplexing (time division duplexing, TDD), the slot formats of the S slots may be slot formats that are preconfigured through RRC signaling.

In other words, the slot formats of the S slots may fall back to the slot formats configured through RRC signaling.

Specifically, in the TDD mode, the base station may configure a slot format for the UE through RRC signaling, to notify the UE of specific uplink symbols, specific downlink symbols, and specific guard periods. When the UE does not receive DCI carrying an SFI, the UE may directly use the slot format configured through RRC signaling. When the UE receives DCI carrying an SFI, a slot format indicated by the SFI overwrites the slot format configured through RRC signaling. When the DCI that carries the SFI and that is received by the UE indicates only some slots in one monitoring period, the slot format configured through RRC signaling may be used for a slot format of another slot.

Optionally, in frequency division duplexing (frequency division duplexing, FDD), symbols corresponding to the preconfigured slot format are all uplink symbols or all downlink symbols.

In an example, on an FDD downlink carrier, 14 symbols corresponding to the slot formats of the S slots are all downlink symbols. For example, 14 symbols corresponding to the slot format 0 in Table 1 are all downlink symbols.

In an example, on an FDD uplink carrier, 14 symbols corresponding to the slot formats of the S slots are all uplink symbols. For example, 14 symbols corresponding to the slot format 1 in Table 1 are all uplink symbols.

In the foregoing technical solution, after the slot formats of the N slots are determined, if there is still a remaining slot in one monitoring period in addition to the N slots, a slot format of the remaining slot may be determined based on the preconfigured slot format or at least one of the M slot formats. In this way, slot formats of all slots on the second carrier in one monitoring period can be determined, and a quantity of slots whose slot formats are determined is increased.

Optionally, a plurality of the first carrier and the at least one second carrier may belong to a plurality of carrier groups, slot formats of slots on carriers in a same carrier group are the same, and slot formats of slots on carriers in different carrier groups are different.

There may be a plurality of first carriers, and each carrier group includes at least one carrier.

Optionally, the base station may send grouping information to the UE.

Accordingly, after receiving the grouping information, the UE may group, based on the grouping information, a plurality of carriers of at least one first carrier and the at least one second carrier.

In the foregoing technical solution, a plurality of carriers are grouped, and carriers on which slot formats of slots are the same belong to a same carrier group. In this way, when a slot format of a slot on the second carrier is determined, a slot format of a slot on only one carrier in one carrier group needs to be determined, and a slot format of a slot on each carrier does not need to be determined. This can reduce signaling overheads and can increase a communication rate.

In this embodiment of this application, when a slot format is indicated in a cross-carrier scenario and SCSs of a plurality of carriers are different, the base station and the UE may obtain the M slot formats based on the signaling that is sent or received on the first carrier, and then determine a slot format of a slot on the second carrier based on the M slot formats. This resolves a problem that the slot format of the slot on the second carrier cannot be determined when the slot format is indicated in the cross-carrier scenario. In addition, slot formats of all slots in one carrier are indicated, so that signaling overheads can be reduced.

Figure 7:
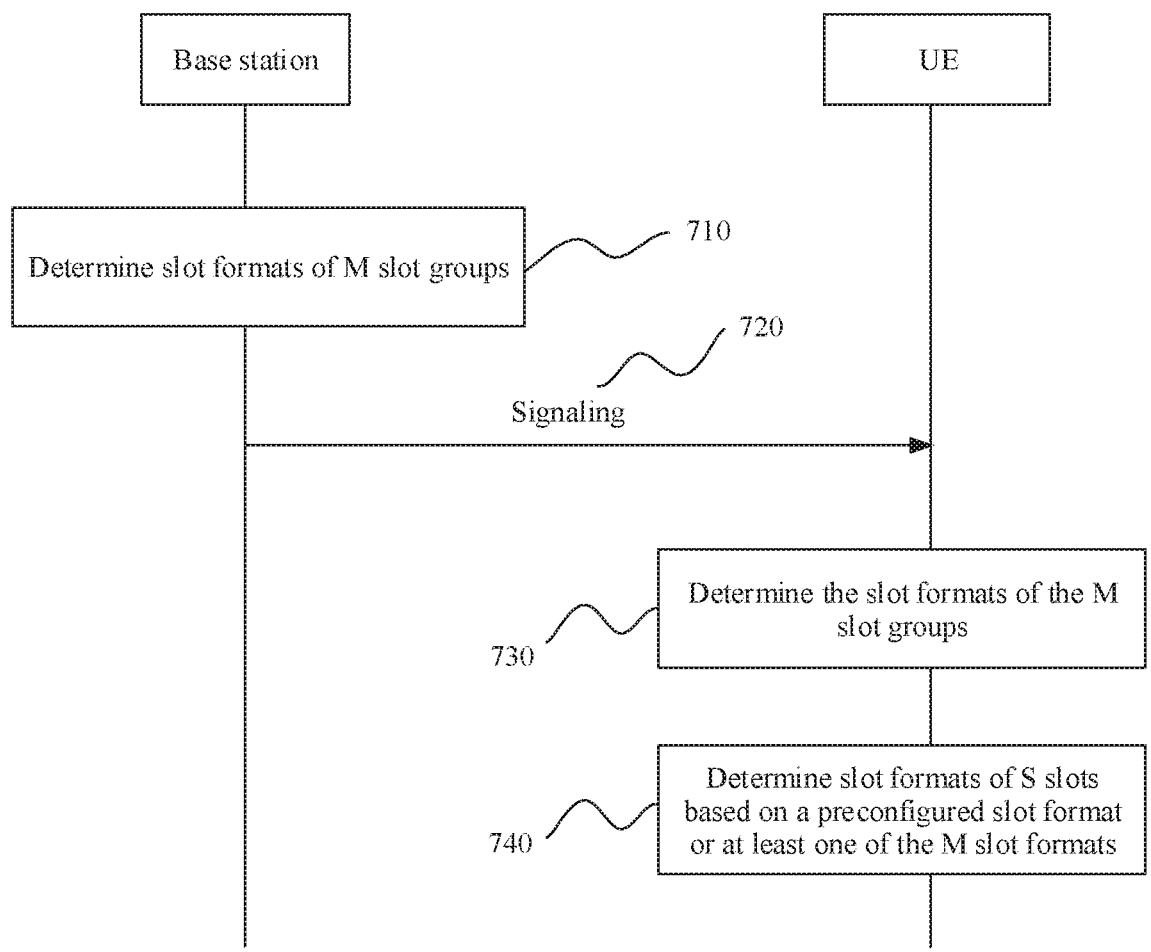
FIG. 7 is a schematic interaction diagram of a communication method according to another embodiment of this application.

FIG. 7 is a schematic interaction diagram of a communication method according to an embodiment of this application. It should be understood that the method in FIG. 7 may be applied to but is not limited to a single-carrier scenario in which M is less than P.

The method in FIG. 7 may include steps 710 to 750. The following separately describes steps 710 to 750 in detail.

710: A base station determines slot formats of M slot groups, where M is a positive integer.

Optionally, the slot formats of the M slot groups may be determined based on M slot formats.

It should be noted herein that the base station may determine the slot formats of the M slot groups in a plurality of specific implementations. A determining manner on the base station side is not specifically limited in the embodiments of this application, provided that the base station can determine the slot formats of the M slot groups.

720: The base station sends signaling to UE. Accordingly, the UE may receive the signaling sent by the base station.

Optionally, the signaling may include indication information of the M slot formats.

Optionally, the signaling may be higher layer signaling, such as RRC signaling.

Optionally, the signaling may be a physical layer signaling, for example, a DCI message. The signaling may be carried on a PDCCH, an EPDCCH, an MPDCCH, a PSCCH, or an NPDCCH. This is not limited in this application.

Optionally, the signaling may be a combination of higher layer signaling and physical layer signaling, for example, a combination of RRC signaling and a DCI message.

730: The UE determines the slot formats of the M slot groups, where each slot group includes at least one slot, and M is a positive integer.

Optionally, the slot formats of the M slot groups may be determined based on the M slot formats.

Optionally, the UE may obtain the M slot formats based on the received signaling.

Optionally, the UE may obtain the M slot formats based on the RRC signaling and/or DCI signaling.

In an example, one slot may have 256 slot formats, and the UE obtains the 256 slot formats based on a prestored table. M slots have $256^M$ slot format combinations in total. The base station may indicate 256 slot format combinations in 256 possible slot format combinations through RRC signaling. After determining the 256 slot format combinations, the base station indicates any one of the 256 slot format combinations through DCI. After receiving the RRC signaling, the UE may learn of the 256 slot format combinations. After receiving the DCI, the UE may learn of a specific slot format combination from a DCI indication, to obtain slot formats of the M slots.

Optionally, the M slot groups may correspond to the M slot formats.

Optionally, the correspondence may be a one-to-one correspondence.

For example, when each slot group includes one slot, the UE may determine that the slot formats of the M slots one-to-one correspond to the M slot formats. To be specific, the first slot $N_1$ in the N slots corresponds to the first slot format $M_1$ in the M slot formats, the second slot $N_2$ in the N slots corresponds to the second slot format $M_2$ in the M slot formats, . . . , and the $N^{th}$ slot $N_N$ in the N slots corresponds to the $M^{th}$ slot format $M_M$ in the M slot formats.

For another example, when each slot group includes H slots, the H×M slots belong to M slot groups, and the M slot groups one-to-one correspond to the M slot formats.

Figure 8:
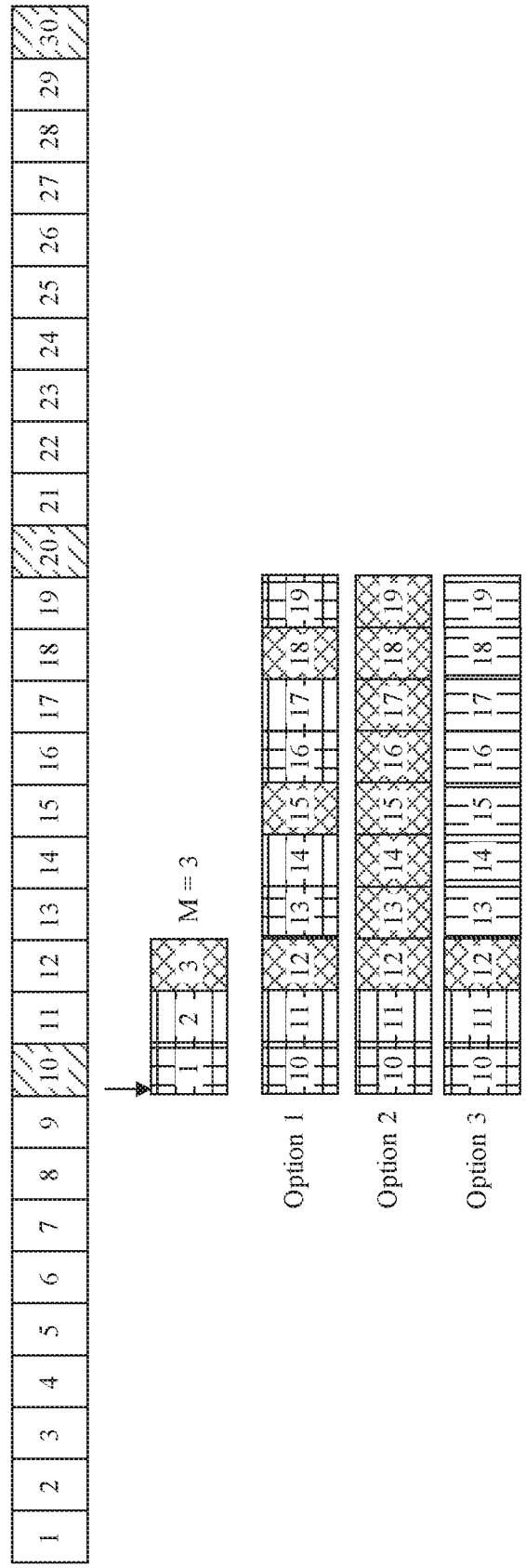
FIG. 8 is a schematic diagram of a slot format in a single-carrier scenario according to an embodiment of this application.

For example, as shown in FIG. 8, M=3, P=10, and each slot group includes one slot. The UE receives three slot formats in a slot #10, and the three received slot formats are respectively applied to the slot #10, a slot #11, and a slot #12. To be specific, a slot format of the slot #10 is the same as a first received slot format, a slot format of the slot #11 is the same as a second received slot format, and a slot format of the slot #12 is the same as a third received slot format.

Figure 9:
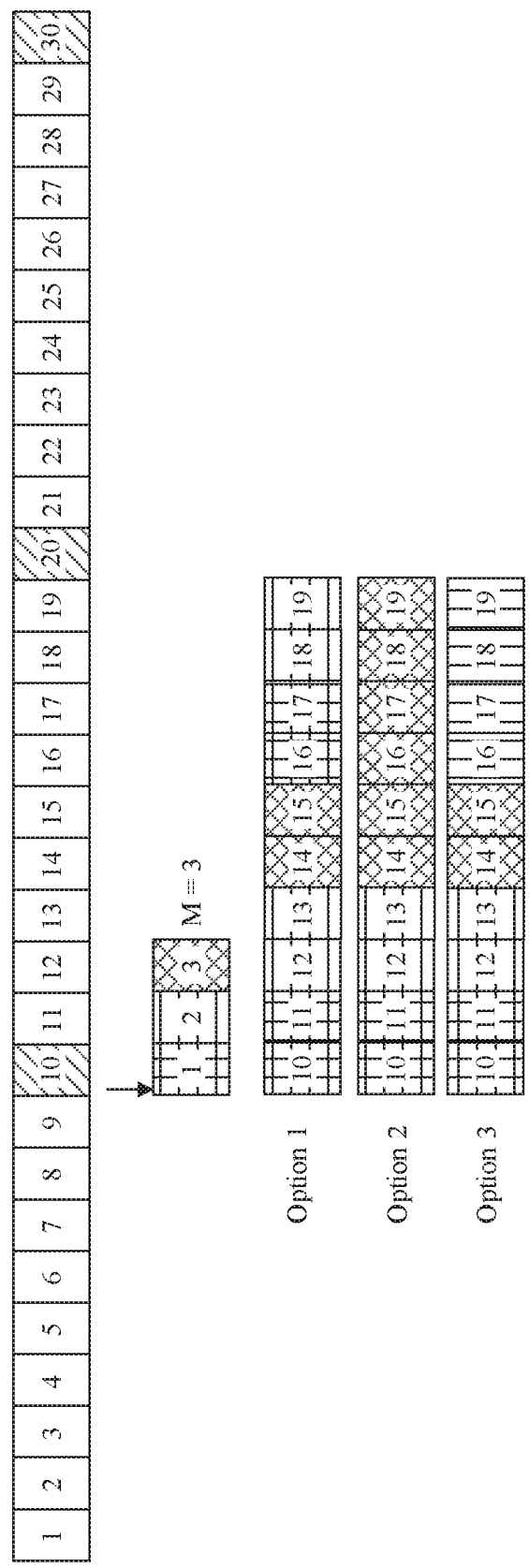
FIG. 9 is a schematic diagram of a slot format in a single-carrier scenario according to an embodiment of this application.

As shown in FIG. 9. M=3, P=10, and each slot group includes two slots. The UE receives three slot formats in a slot #10, and the three received slot formats are applied to the slot #10, a slot #11, a slot #12, a slot #13, a slot #14, and a slot #15. The six slots may belong to three slot groups. To be specific, the slots #10 and #11 belong to a first slot group, the slots #12 and #13 belong to a second slot group, and the slots #14 and #15 belong to a third slot group. The three slot groups one-to-one correspond to the three slot formats. To be specific, the first slot group corresponds to a first slot format $M_1$, the second slot group corresponds to a second slot format $M_2$, and the third slot group corresponds to a third slot format $M_3$. In other words, a slot format of the slots #10 and #11 is the same as the first slot format $M_1$, a slot format of the slots #12 and #13 is the same as the second slot format $M_2$, and a slot format of the slots #14 and #15 is the same as the third slot format $M_3$.

Optionally, the UE may alternatively determine the slot formats of the M slot groups based on the received M slot formats and an offset.

Optionally, the UE receives the M slot formats in a slot #K, and it is assumed that the offset is S. If each slot group includes one slot, the M slot formats may be applied to a slot #(K+S) to a slot #(K+S+M−1).

For example, the UE receives three slot formats in a slot #10, an offset is 2, and each slot group includes one slot. In this case, a slot format of a slot #12 is the same as a first slot format $M_1$, a slot format of a slot #13 is the same as a second slot format $M_2$, and a slot format of a slot #14 is the same as a third slot format $M_3$.

For another example, if each slot group includes two slots, the UE receives three slot formats in a slot #10, and an offset is 2, a slot format of slots #14 and #15 is the same as a first slot format, a slot format of slots #16 and #17 is the same as a second slot format, and a slot format of slots #18 and #19 is the same as a third slot format.

It should be understood that the offset has been described in detail in the foregoing, and details are not described herein again.

740: The UE determines slot formats of S slots based on a preconfigured slot format or at least one of the M slot formats.

The S slots are slots other than slots in the M slot groups in one monitoring period P.

Optionally, the preconfigured slot format is configured through RRC signaling.

Optionally, the base station may send the RRC signaling to the UE, where the RRC signaling indicates the preconfigured slot format.

The RRC signaling may be common RRC signaling or dedicated RRC signaling. This is not limited in this application.

Optionally, the preconfigured slot format may be determined by the UE based on a protocol specification.

In a possible implementation, the slot formats of the S slots may be determined based on the M slot formats.

Optionally, the S slots may be divided into L slot groups, and slot formats of M slot groups of the L slot groups are different. In other words, slot formats of two slot groups that are separated by M slot groups are the same, and slot formats of M adjacent slot groups are different from each other.

Each slot group includes at least one slot, and slots in each slot group have a same slot format.

Still referring to FIG. 8, S=7, and each slot group includes one slot. For example, in an option 1, a slot format of slots #13, #16, and #19 is the same as the slot format of the slot #10; a slot format of slots #14 and #17 is the same as a slot format of a slot #11; and a slot format of slots #15 and #18 is the same as a slot format of a slot #12.

Still referring to FIG. 9, S=4, and each slot group includes two slots. For example, in an option 1, the four slots may be divided into two slot groups, slots #16 and #17 belong to one slot group, and slots #18 and #19 belong to the other slot group. Slot formats of two slot groups that are separated by three slot groups are the same. The slots #16 and #17 and the slots #10 and #11 are separated by three slot groups, and the slots #18 and #19 and the slots #12 and #13 are separated by three slot groups. Therefore, a slot format of the slots #16 and #17 is the same as the slot format of the slots #10 and slot #11, and a slot format of the slots #18 and slot #19 is the same as the slot format of the slots #12 and #13.

It should be noted herein that the base station also needs to determine the slot formats of the S slots. However, the base station may determine the slot formats of the S slots in a plurality of specific implementations, and the implementations may be different from implementations in which the UE determines the slot formats of the S slots. The determining manner on the base station side is not limited in the embodiments of this application, provided that the base station can determine the slot formats of the S slots.

Optionally, the base station may determine the S slots based on a preconfigured slot format or at least one of the M slot formats.

In a possible implementation, the slot formats of the S slots may be determined based on the $M^{th}$ slot format.

For example, still referring to FIG. 8 and FIG. 9, for example, in an option 2, slot formats of remaining slots, that is, the S slots, are the same as a slot format of the third slot.

In a possible implementation, the slot formats of the S slots may be determined based on the preconfigured slot format.

Optionally, in time division duplexing (time division duplexing, TDD), the slot formats of the S slots may be slot formats that are preconfigured through RRC signaling.

In other words, the slot formats of the S slots may fall back to the slot formats configured through RRC signaling.

Specifically, in the TDD mode, the base station may configure a slot format for the UE through RRC signaling, to notify the UE of specific uplink symbols, specific downlink symbols, and specific guard periods. When the UE does not receive DCI carrying an SFI, the UE may directly use the slot format configured through RRC signaling. When the UE receives DCI carrying an SFI, a slot format indicated by the SFI overwrites the slot format configured through RRC signaling. When the DCI that carries the SFI and that is received by the UE indicates only some slots in one monitoring period, the slot format configured through RRC signaling may be used for a slot format of another slot.

Optionally, in frequency division duplexing (frequency division duplexing, FDD), symbols corresponding to the preconfigured slot format are all uplink symbols or all downlink symbols.

In an example, on an FDD downlink carrier, 14 symbols corresponding to the slot formats of the S slots are all downlink symbols. For example, 14 symbols corresponding to the slot format 0 in Table 1 are all downlink symbols.

In an example, on an FDD uplink carrier, 14 symbols corresponding to the slot formats of the S slots are all uplink symbols. For example, 14 symbols corresponding to the slot format 1 in Table 1 are all uplink symbols.

In this embodiment of this application, when the monitoring period P is greater than M, after determining the slot formats of the M slot groups based on the sent or received signaling, the base station or the UE may further determine a slot format of a remaining slot based on the preconfigured slot format or the at least one of the M slot formats. In this way, a problem that the slot format of the remaining slot is uncertain can be resolved.

The foregoing describes the method in the embodiments of this application in detail. To implement the functions in the methods provided in the embodiments of this application, the terminal device may include a hardware structure and/or a software module, and implement the functions in a form of the hardware structure, the software module, or a combination of the hardware structure and the software module. Whether a function in the foregoing functions is performed by using the hardware structure, the software module, or the combination of the hardware structure and the software module depends on a specific application and a design constraint condition of the technical solutions.

Figure 10:
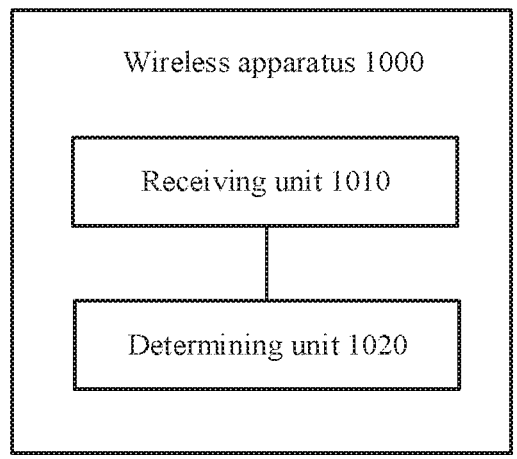
FIG. 10 is a schematic block diagram of a wireless apparatus according to an embodiment of this application.

Based on a same inventive concept as the foregoing method embodiments, an embodiment of this application provides a wireless apparatus, configured to implement functions of the terminal device in the foregoing method. The wireless apparatus may be a terminal device or an apparatus in a terminal device. FIG. 10 is a schematic block diagram of a wireless apparatus according to an embodiment of this application. It should be understood that a wireless apparatus 1000 shown in FIG. 10 is merely an example. The wireless apparatus 1000 in this embodiment of this application may further include another module or unit, or include a module with a function similar to that of each module in FIG. 10, or may not necessarily include all modules in FIG. 10.

A receiving unit 1010 is configured to receive signaling on a first carrier.

A determining unit 1020 is configured to determine slot formats of N slots on at least one second carrier, where the slot formats of the N slots are determined based on M slot formats, N and M are positive integers, the M slot formats are obtained based on the received signaling, and the N slots are determined based on at least one of the following: a moment at which the signaling is received, and a relationship between a length of a first slot on the first carrier and a length of a second slot on the at least one second carrier.

Optionally, the determining unit 1020 may be further configured to determine a start slot of the N slots based on the moment at which the signaling is received.

Optionally, the start slot of the N slots is a slot in which the moment at which the receiving unit 1010 receives the signaling is located on the at least one second carrier, or is a next slot of a slot in which the moment at which the receiving unit 1010 receives the signaling is located on the at least one second carrier.

Optionally, M is equal to N, and the M slots respectively correspond to N slot formats.

Optionally, the M slot formats respectively correspond to M slot groups, and each of the M slot groups includes at least one of the N slots.

Optionally, a quantity of slots included in each slot group is determined based on the relationship between the length of the first slot and the length of the second slot.

Optionally, the determining unit 1020 may be further configured to determine slot formats of S slots, where the S slots are slots other than the N slots in one monitoring period, and the slot formats of the S slots are determined based on a preconfigured slot format or at least one of the M slot formats.

Optionally, the S slots are divided into L slot groups, each slot group includes at least one slot, slots in each slot group have a same slot format, and M slot groups of the L slot groups have different slot formats.

Optionally, the determining unit 1020 determines that the slot formats of the S slots are the $M^{th}$ slot format or the last slot format of the M slot formats.

Optionally, the preconfigured slot format is configured through radio resource control RRC signaling.

Optionally, symbols corresponding to the preconfigured slot format are all uplink symbols or all downlink symbols.

Optionally, the first carrier and the at least one second carrier belong to a plurality of carrier groups, slot formats of slots on carriers in a same carrier group are the same, and slot formats of slots on carriers in different carrier groups are different.

Optionally, a subcarrier spacing SCS of the first carrier is different from a subcarrier spacing SCS of the at least one second carrier.

Figure 11:
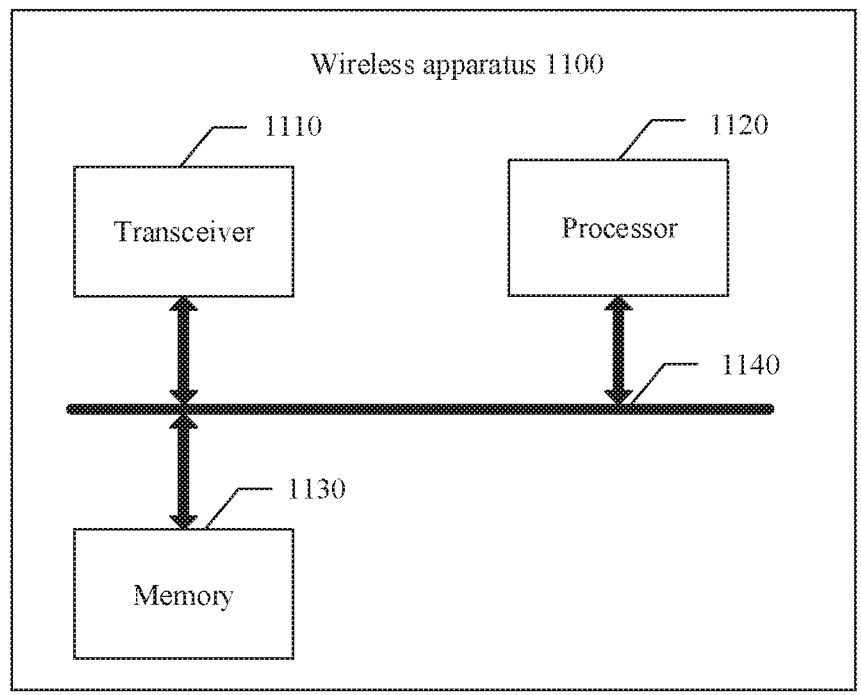
FIG. 11 is a schematic block diagram of a wireless apparatus according to an embodiment of this application.

FIG. 11 shows a wireless apparatus 1100 according to an embodiment of this application. The apparatus 1100 is configured to implement functions of the terminal device in the foregoing method. The wireless apparatus may be a terminal device or an apparatus in a terminal device. The wireless apparatus may be a chip system. In this embodiment of this application, the chip system may include a chip, or may include a chip and another discrete component. The wireless apparatus 1100 includes a processor 1120, configured to implement functions of the terminal device in the method provided in the embodiments of this application. For example, the processor 1120 may be configured to determine slot formats of N slots on at least one second carrier or the like. For details, refer to detailed descriptions in the method example. Details are not described herein again.

The wireless apparatus 1100 may further include a memory 1130, configured to store a program instruction and/or data. The memory 1130 is coupled to the processor 1120. The processor 1120 may operate with the memory 1130 collaboratively. The processor 1120 may execute the program instruction stored in the memory 1130.

The wireless apparatus 1100 may further include a transceiver 1110 (which may be replaced with a receiver and a transmitter, and the receiver implements a receiving function), configured to communicate with another device through a transmission medium, so that an apparatus in the wireless apparatus 1100 may communicate with the another device. The processor 1120 sends and receives signaling through the transceiver 1110, and is configured to implement the method performed by the terminal device in the method embodiments of this application.

A specific connection medium between the transceiver 1110, the processor 1120, and the memory 1130 is not limited in this embodiment of this application. In this embodiment of this application, the memory 1130, the processor 1120, and the transceiver 1110 are connected through a bus 1140 in FIG. 11. The bus is represented by using a thick line in FIG. 11. A manner of a connection between other components is merely an example for description, and is not limited thereto. The bus may be classified into an address bus, a data bus, a control bus, and the like. For ease of representation, only one thick line is used to represent the bus in FIG. 11, but this does not mean that there is only one bus or only one type of bus.

Figure 12:
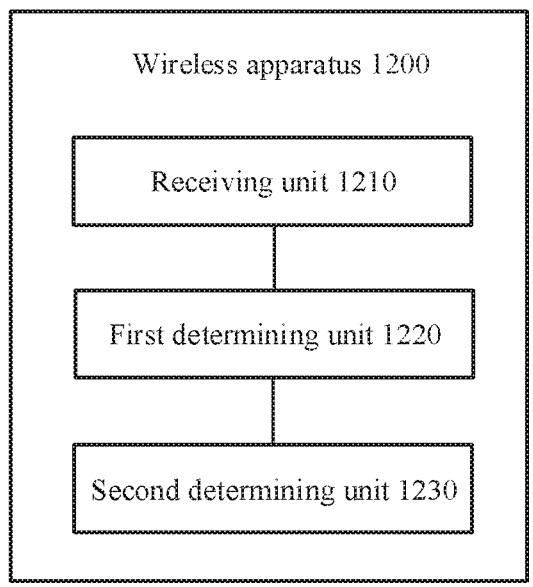
FIG. 12 is a schematic block diagram of a wireless apparatus according to an embodiment of this application.

Based on a same inventive concept as the foregoing method embodiments, an embodiment of this application provides a wireless apparatus, configured to implement functions of the terminal device in the foregoing method. The wireless apparatus may be a terminal device or an apparatus in a terminal device. FIG. 12 is a schematic block diagram of a wireless apparatus according to an embodiment of this application. It should be understood that a wireless apparatus 1200 shown in FIG. 12 is merely an example. The wireless apparatus 1200 in this embodiment of this application may further include another module or unit, or include a module with a function similar to a function of each module in FIG. 12, or may not necessarily include all modules in FIG. 12.

A receiving unit 1210 is configured to receive signaling.

A first determining unit 1220 is configured to determine slot formats of M slot groups, where M is a positive integer, the slot formats of the M slot groups are determined based on M slot formats, and the M slot formats are obtained based on the received signaling.

A second determining unit 1230 is configured to determine slot formats of S slots based on a preconfigured slot format or at least one of the M slot formats, where the S slots are slots other than slots in the M slot groups in one monitoring period.

Optionally, the M slot formats respectively correspond to the M slot groups, and each of the M slot groups includes at least one slot.

Optionally, the S slots are divided into L slot groups, each slot group includes at least one slot, slots in each slot group have a same slot format, and M slot groups of the L slot groups have different slot formats.

Optionally, the second determining unit 1230 determines that the slot formats of the S slots are the $M^{th}$ slot format or the last slot format of the M slot formats.

Optionally, the preconfigured slot format is configured through radio resource control RRC signaling, and/or symbols corresponding to the preconfigured slot format are all uplink symbols or all downlink symbols.

Figure 13:
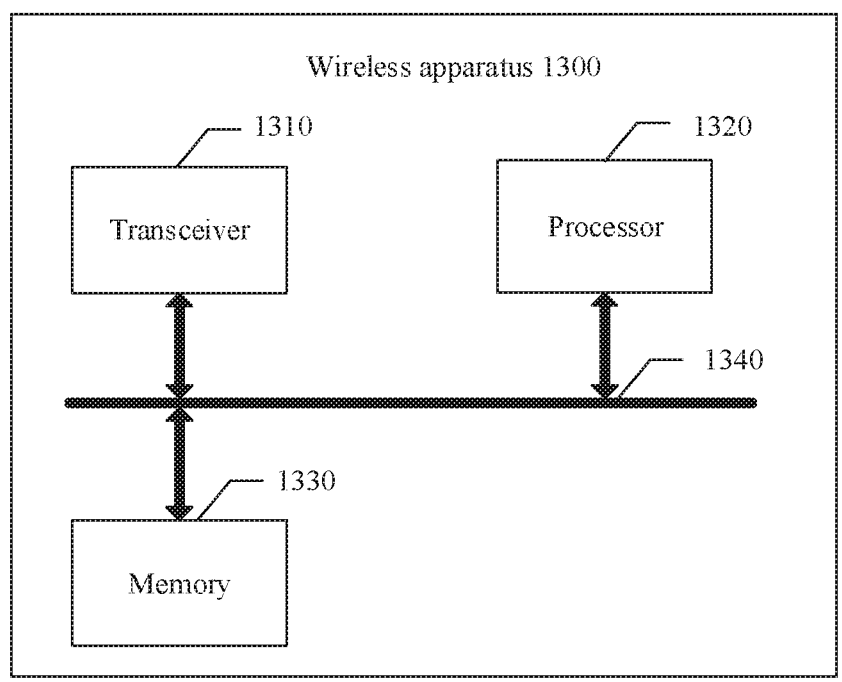
FIG. 13 is a schematic block diagram of a wireless apparatus according to an embodiment of this application.

FIG. 13 shows a wireless apparatus 1300 according to an embodiment of this application. The apparatus 1300 is configured to implement functions of the terminal device in the foregoing method. The wireless apparatus may be a terminal device or an apparatus in a terminal device. The wireless apparatus may be a chip system. In this embodiment of this application, the chip system may include a chip, or may include a chip and another discrete component. The wireless apparatus 130) includes a processor 1320, configured to implement functions of the terminal device in the method provided in the embodiments of this application. For example, the processor 1320 may be configured to determine slot formats of M slot groups or the like. For details, refer to detailed descriptions in the method example. Details are not described herein again.

The wireless apparatus 1300 may further include a memory 1330, configured to store a program instruction and/or data. The memory 1330 is coupled to the processor 1320. The processor 1320 may operate with the memory 1330 collaboratively. The processor 1320 may execute the program instruction stored in the memory 1330.

The wireless apparatus 1300 may further include a transceiver 1310 (which may be replaced with a receiver and a transmitter, and the receiver implements a receiving function), configured to communicate with another device through a transmission medium, so that an apparatus in the wireless apparatus 1300 may communicate with the another device. The processor 1320 sends and receives signaling through the transceiver 1310, and is configured to implement the method performed by the terminal device in the method embodiments of this application.

A specific connection medium between the transceiver 1310, the processor 1320, and the memory 1330 is not limited in this embodiment of this application. In this embodiment of this application, the memory 1330, the processor 1320, and the transceiver 1310 are connected through a bus 1340 in FIG. 13. The bus is represented by using a thick line in FIG. 13. A manner of a connection between other components is merely an example for description, and is not limited thereto. The bus may be classified into an address bus, a data bus, a control bus, and the like. For ease of representation, only one thick line is used to represent the bus in FIG. 13, but this does not mean that there is only one bus or only one type of bus.

Figure 14:
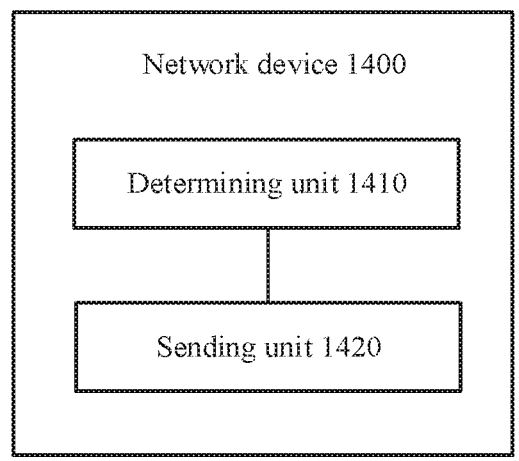
FIG. 14 is a schematic block diagram of a network device according to an embodiment of this application.

Based on a same inventive concept as the foregoing method embodiments, an embodiment of this application provides a network device. FIG. 14 is a schematic block diagram of a network device according to an embodiment of this application. It should be understood that a network device 1400 shown in FIG. 14 is merely an example. The network device 1400 in this embodiment of this application may further include another module or unit, or include a module with a function similar to a function of each module in FIG. 14, or may not necessarily include all modules in FIG. 14.

A determining unit 1410 is configured to determine slot formats of N slots on at least one second carrier, where the slot formats of the N slots are determined based on M slot formats, and N and M are positive integers.

A sending unit 1420 is configured to send signaling on a first carrier, where the signaling includes indication information of the M slot formats.

The N slots are related to at least one of the following: a moment at which the sending unit 1420 sends the signaling, and a relationship between a length of a first slot on the first carrier and a length of a second slot on the at least one second carrier.

Optionally, a start slot of the N slots is related to the moment at which the sending unit 1420 sends the signaling.

Optionally, the start slot of the N slots is a slot in which the moment at which the sending unit 1420 sends the signaling is located on the at least one second carrier, or is a next slot of a slot in which the moment at which the sending unit 1420 sends the signaling is located on the at least one second carrier.

Optionally, M is equal to N, and the M slots respectively correspond to N slot formats.

Optionally, the M slot formats respectively correspond to M slot groups, and each of the M slot groups includes at least one of the N slots.

Optionally, a quantity of slots included in each slot group is determined based on the relationship between the length of the first slot and the length of the second slot.

Optionally, the determining unit 1410 may be further configured to determine slot formats of S slots, where the S slots are slots other than the N slots in one monitoring period, and the slot formats of the S slots are determined based on a preconfigured slot format or at least one of the M slot formats.

Optionally, the S slots are divided into L slot groups, each slot group includes at least one slot, slots in each slot group have a same slot format, and M slot groups of the L slot groups have different slot formats.

Optionally, the determining unit 1410 determines that the slot formats of the S slots are the $M^{th}$ slot format or the last slot format of the M slot formats.

Optionally, the preconfigured slot format is configured through radio resource control RRC signaling.

Optionally, symbols corresponding to the preconfigured slot format are all uplink symbols or all downlink symbols.

Optionally, the first carrier and the at least one second carrier belong to a plurality of carrier groups, slot formats of slots on carriers in a same carrier group are the same, and slot formats of slots on carriers in different carrier groups are different.

Optionally, a subcarrier spacing SCS of the first carrier is different from a subcarrier spacing SCS of the at least one second carrier.

Figure 15:
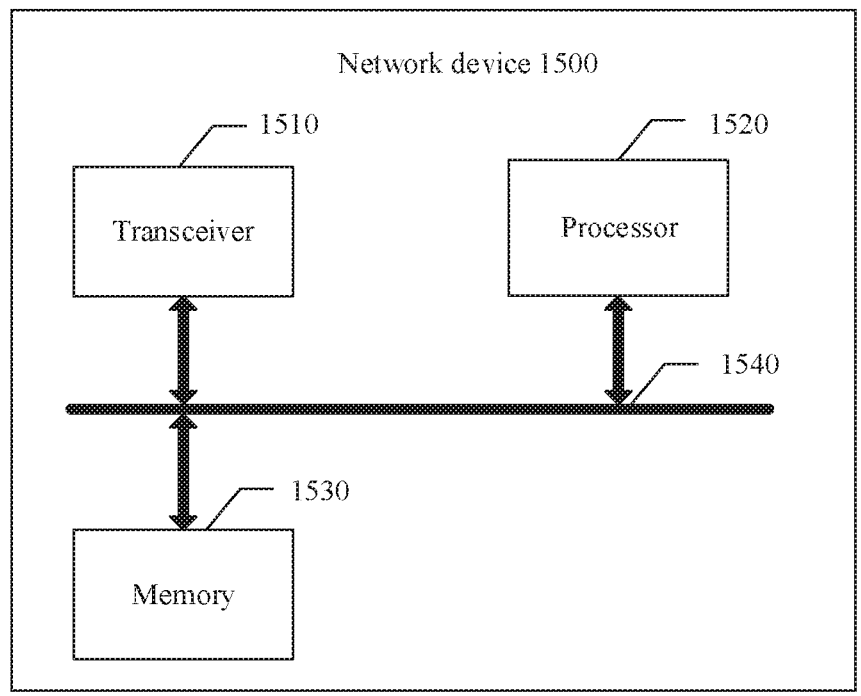
FIG. 15 is a schematic block diagram of a network device according to an embodiment of this application.

FIG. 15 shows a network device 1500 according to an embodiment of this application. The network device 1500 includes a processor 1520, configured to implement functions of the network device in the method provided in the embodiments of this application. For example, the processor 1520 may be configured to determine slot formats of N slots on at least one second carrier or the like. For details, refer to detailed descriptions in the method example. Details are not described herein again.

The network device 1500 may further include a memory 1530, configured to store a program instruction and/or data. The memory 1530 is coupled to the processor 1520. The processor 1520 may operate with the memory 1530 collaboratively. The processor 1520 may execute the program instruction stored in the memory 1530.

The network device 1500 may further include a transceiver 1510, configured to communicate with another device through a transmission medium, so that an apparatus in the network device 1500 may communicate with the another device. The processor 1520 sends and receives signaling through the transceiver 1510, and is configured to implement the method performed by the network device in the method embodiments of this application.

A specific connection medium between the transceiver 1510, the processor 1520, and the memory 1530 is not limited in this embodiment of this application. In this embodiment of this application, the memory 1530, the processor 1520, and the transceiver 1510 are connected through a bus 1540 in FIG. 15. The bus is represented by using a thick line in FIG. 15. A manner of a connection between other components is merely an example for description, and is not limited thereto. The bus may be classified into an address bus, a data bus, a control bus, and the like. For ease of representation, only one thick line is used to represent the bus in FIG. 15, but this does not mean that there is only one bus or only one type of bus.

Figure 16:
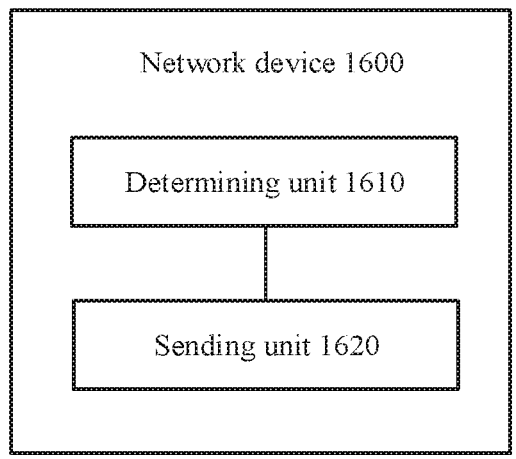
FIG. 16 is a schematic block diagram of a network device according to an embodiment of this application.

Based on a same inventive concept as the foregoing method embodiments, an embodiment of this application provides a network device. FIG. 16 is a schematic block diagram of a network device according to an embodiment of this application. It should be understood that a network device 1600 shown in FIG. 16 is merely an example. The network device 1600 in this embodiment of this application may further include another module or unit, or include a module with a function similar to a function of each module in FIG. 16, or may not necessarily include all modules in FIG. 16.

A determining unit 1610 is configured to determine slot formats of M slot groups, where M is a positive integer, and the slot formats of the M slot groups are determined based on M slot formats.

A sending unit 1620 is configured to send signaling, where the signaling includes indication information of the M slot formats.

S slot formats are related to a preconfigured slot format or at least one of the M slot formats, and S slots are slots other than slots in the M slot groups in one monitoring period.

Optionally, the M slot formats respectively correspond to the M slot groups, and each of the M slot groups includes at least one slot.

Optionally, the S slots are divided into L slot groups, each slot group includes at least one slot, slots in each slot group have a same slot format, and M slot groups of the L slot groups have different slot formats.

Optionally, a second determining unit 1610 determines that the slot formats of the S slots are the $M^{th}$ slot format or the last slot format of the M slot formats.

Optionally, the preconfigured slot format is configured through radio resource control RRC signaling, and/or symbols corresponding to the preconfigured slot format are all uplink symbols or all downlink symbols.

Figure 17:
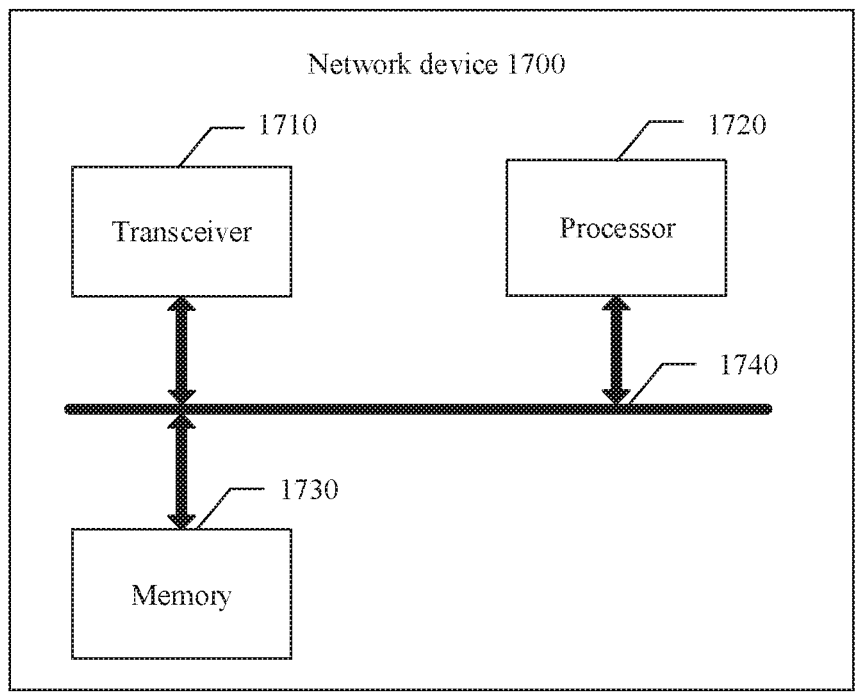
FIG. 17 is a schematic block diagram of a network device according to an embodiment of this application.

FIG. 17 shows a network device 1700 according to an embodiment of this application. The network device 1700 includes a processor 1720, configured to implement functions of the network device in the method provided in the embodiments of this application. For example, the processor 1720 may be configured to determine slot formats of M slot groups or the like. For details, refer to detailed descriptions in the method example. Details are not described herein again.

The network device 1700 may further include a memory 1730, configured to store a program instruction and/or data. The memory 1730 is coupled to the processor 1720. The processor 1720 may operate with the memory 1730 collaboratively. The processor 1720 may execute the program instruction stored in the memory 1730.

The network device 1700 may further include a transceiver 1710, configured to communicate with another device through a transmission medium, so that an apparatus in the network device 1700 may communicate with the another device. The processor 1720 sends and receives signaling through the transceiver 1710, and is configured to implement the method performed by the network device in the method embodiments of this application.

A specific connection medium between the transceiver 1710, the processor 1720, and the memory 1730 is not limited in this embodiment of this application. In this embodiment of this application, the memory 1730, the processor 1720, and the transceiver 1710 are connected through a bus 1740 in FIG. 17. The bus is represented by using a thick line in FIG. 17. A manner of a connection between other components is merely an example for description, and is not limited thereto. The bus may be classified into an address bus, a data bus, a control bus, and the like. For ease of representation, only one thick line is used to represent the bus in FIG. 17, but this does not mean that there is only one bus or only one type of bus.

An embodiment of this application further provides a communications system, including at least one network device and at least one terminal device for executing the embodiments of this application.

An embodiment of this application further provides an apparatus (for example, an integrated circuit, a wireless device, or a circuit module), configured to implement the foregoing communication method. An apparatus for implementing a power tracker and/or a power generator described in this specification may be an independent device or may be a part of a larger device. The device may be: (i) an independent IC, (ii) a set of one or more ICs, where the set may include a memory IC for storing data and/or an instruction, (iii) an RFIC, such as an RF receiver or an RF transmitter/receiver, (iv) an ASIC, such as a mobile station modem, (v) a module that can be embedded in another device, (vi) a receiver, a cellular phone, a wireless device, or a mobile unit, or (vii) others The method and the apparatus provided in the embodiments of this application may be applied to a terminal device or a network device (may be collectively referred to as a wireless device). The terminal device or the network device or the wireless device may include a hardware layer, an operating system layer running on the hardware layer, and an application layer running on the operating system layer. The hardware layer includes hardware such as a central processing unit (central processing unit, CPU), a memory management unit (memory management unit, MMU), and a memory (also referred to as a main memory). The operating system may be any one or more computer operating systems, for example, a Linux operating system, a Unix operating system, an Android operating system, an iOS operating system, or a Windows operating system, that implement service processing through a process (process). The application layer includes applications such as a browser, an address book, word processing software, and instant messaging software. In addition, in the embodiments of this application, a specific structure of an execution body of the method is not limited in the embodiments of this application.

It can be understood that, the accompanying drawings show only a simplified design of the wireless apparatus. In an actual application, the wireless apparatus may include any quantities of transmitters, receivers, processors, controllers, memories, communications units, and the like. For example, the described apparatus embodiments are merely examples. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

When the functions are implemented in a form of a software function unit and sold or used as an independent product, the functions may be stored in a computer-readable storage medium. Based on such an understanding, the technical solutions of the embodiments of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory, a random access memory, a magnetic disk, or an optical disc.

The foregoing descriptions are merely specific embodiments of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:
1. A communication method, comprising:
receiving, by a terminal device, signaling on a first carrier; and
determining, by the terminal device based on the received signaling, M slot formats of N slots on a second carrier, wherein N and M are positive integers, wherein M is greater than 1, wherein each of the M slot formats corresponds to a respective slot group in M slot groups, and wherein each of the M slot groups comprises more than one slot of the N slots that have a same slot format, and wherein:
a quantity of the N slots on the second carrier is determined based on:
a relationship between a length of a first slot on the first carrier and a length of a second slot on the second carrier, or a relationship between a subcarrier spacing (SCS) of the first carrier and a subcarrier spacing of the second carrier; and a start slot of the N slots on the second carrier is a slot on the second carrier that corresponds to a receiving moment at which the signaling is received on the first carrier.

2. The method according to claim 1, wherein the length of the first slot on the first carrier is a multiple of the length of the second slot on the second carrier.

3. The method according to claim 1, wherein the relationship between the subcarrier spacing of the first carrier and the subcarrier spacing of the second carrier is a multiple relationship.

4. The method according to claim 1, wherein a quantity of slots comprised in each of the M slot groups is determined based on the relationship between the length of the first slot and the length of the second slot.

5. The method according to claim 1, wherein the SCS of the first carrier is different from the SCS of the second carrier.

6. An apparatus, comprising:
one or more processors, and
a computer-readable storage medium storing program instructions, wherein, when executed by the one or more processors, the instructions cause the apparatus to:
receive signaling on a first carrier; and
determine M slot formats of N slots on a second carrier based on the received signaling, wherein N and M are positive integers, wherein M is greater than 1, wherein each of the M slot formats corresponds to a respective slot group in M slot groups, and wherein each of the M slot groups comprises more than one slot of the N slots that have a same slot format, and wherein:
a quantity of the N slots on the second carrier is determined based on:
a relationship between a length of a first slot on the first carrier and a length of a second slot on the second carrier, or
a relationship between a subcarrier spacing (SCS) of the first carrier and a subcarrier spacing of the second carrier; and
a start slot of the N slots on the second carrier is a slot on the second carrier that corresponds to a receiving moment at which the signaling is received on the first carrier.

7. The apparatus according to claim 6, wherein the length of the first slot on the first carrier is a multiple of the length of the second slot on the second carrier.

8. The apparatus according to claim 6, wherein the relationship between the subcarrier spacing of the first carrier and the subcarrier spacing of the second carrier is a multiple relationship.

9. The apparatus according to claim 6, wherein a quantity of slots comprised in each of the M slot groups is determined based on the relationship between the length of the first slot and the length of the second slot.

10. The apparatus according to claim 6, wherein the SCS of the first carrier is different from the SCS of the second carrier.

11. An apparatus, comprising:
one or more processors, and
a computer-readable storage medium storing program instructions, wherein, when executed by the one or more processors, the instructions cause the apparatus to:
determine M slot formats of N slots on a second carrier, wherein N and M are positive integers, wherein M is greater than 1, wherein each of the M slot formats corresponds to a respective slot group in M slot groups, and wherein each of the M slot groups comprises more than one slot of the N slots that have a same slot format; and
send signaling on a first carrier, wherein the signaling comprises indication information of the M slot formats, and wherein:
a quantity of the N slots on the second carrier is determined based on:
a relationship between a length of a first slot on the first carrier and a length of a second slot on the second carrier, or
a relationship between a subcarrier spacing (SCS) of the first carrier and a subcarrier spacing of the second carrier; and
a start slot of the N slots on the second carrier is a slot on the second carrier that corresponds to a receiving moment at which the signaling is received on the first carrier.

12. The apparatus according to claim 11, wherein the length of the first slot on the first carrier is a multiple of the length of the second slot on the second carrier.

13. The apparatus according to claim 11, wherein a quantity of slots comprised in each of the M slot groups is determined based on the relationship between the length of the first slot and the length of the second slot.

14. The apparatus according to claim 11, wherein the SCS of the first carrier is different from the SCS of the second carrier.

15. A communication method, comprising:
determining, by a network device, M slot formats of N slots on a second carrier, wherein N and M are positive integers, wherein M is greater than 1, wherein each of the M slot formats corresponds to a respective slot group in M slot groups, and wherein each of the M slot groups comprises more than one slot of the N slots that have a same slot format; and
sending, by the network device, signaling on a first carrier, wherein the signaling comprises indication information of the M slot formats, and wherein:
a quantity of the N slots on the second carrier is determined based on:
a relationship between a length of a first slot on the first carrier and a length of a second slot on the second carrier, or
a relationship between a subcarrier spacing (SCS) of the first carrier and a subcarrier spacing of the second carrier; and
a start slot of the N slots on the second carrier is a slot on the second carrier that corresponds to a receiving moment at which the signaling is received on the first carrier.

16. The communication method according to claim 15, wherein the length of the first slot on the first carrier is a multiple of the length of the second slot on the second carrier.

17. The communication method according to claim 15, wherein a quantity of slots comprised in each of the M slot groups is determined based on the relationship between the length of the first slot and the length of the second slot.

18. The communication method according to claim 15, wherein the SCS of the first carrier is different from the SCS of the second carrier.

* * * * *